(12) United States Patent
Harrington et al.

(10) Patent No.: US 12,553,026 B2
(45) Date of Patent: Feb. 17, 2026

(54) SYSTEM AND METHODS FOR SUB-POPULATION IDENTIFICATION WITHIN A MIXTURE OF PARTICLES BASED ON CRITICAL RANGES OF VALUES

(71) Applicant: ABS GLOBAL, INC., DeForest, WI (US)

(72) Inventors: Jim Harrington, DeForest, WI (US); Dan Antonuk, DeForest, WI (US); Fred Savage, DeForest, WI (US); David Appleyard, DeForest, WI (US); Matthew Ebersole, DeForest, WI (US)

(73) Assignee: ABS GLOBAL, INC., Deforest, WI (US)

( * ) Notice: Subject to any disclaimer, the term of this patent is extended or adjusted under 35 U.S.C. 154(b) by 1014 days.

(21) Appl. No.: 17/416,727

(22) PCT Filed: Dec. 21, 2018

(86) PCT No.: PCT/IB2018/001641
§ 371 (c)(1),
(2) Date: Jun. 21, 2021

(87) PCT Pub. No.: WO2020/128561
PCT Pub. Date: Jun. 25, 2020

(65) Prior Publication Data
US 2022/0064594 A1    Mar. 3, 2022

(51) Int. Cl.
*C12N 5/071* (2010.01)
*G01N 15/10* (2024.01)
*G01N 15/14* (2024.01)
*G01N 15/149* (2024.01)

(52) U.S. Cl.
CPC ....... *C12N 5/0612* (2013.01); *G01N 15/1459* (2013.01); *G01N 2015/1016* (2024.01); *G01N 2015/1402* (2013.01); *G01N 15/149* (2024.01)

(58) Field of Classification Search
None
See application file for complete search history.

(56) References Cited

U.S. PATENT DOCUMENTS

| | | |
|---|---|---|
| 3,390,449 A | 7/1968 | Fox |
| 3,649,829 A | 3/1972 | Randolph |
| 3,661,460 A | 5/1972 | Elking et al. |
| 3,710,933 A | 1/1973 | Fulwyler et al. |
| 3,764,901 A | 10/1973 | Kachel |
| 3,791,517 A | 2/1974 | Friedman |
| 4,175,662 A | 11/1979 | Zold |
| 4,325,706 A | 4/1982 | Gershman et al. |
| 4,395,397 A | 7/1983 | Shapiro |
| 4,409,106 A | 10/1983 | Furuta et al. |
| 4,424,132 A | 1/1984 | Iriguchi |
| 4,660,971 A | 4/1987 | Sage et al. |
| 4,667,830 A | 5/1987 | Nozaki, Jr. et al. |
| 4,765,737 A | 8/1988 | Harris et al. |
| 4,885,473 A | 12/1989 | Shofner et al. |
| 4,919,817 A | 4/1990 | Schoendorfer et al. |
| 4,983,038 A | 1/1991 | Ohki et al. |
| 5,007,732 A | 4/1991 | Ohki et al. |
| 5,030,002 A | 7/1991 | North, Jr. |
| 5,100,627 A | 3/1992 | Buican et al. |
| 5,125,749 A | 6/1992 | Leugers et al. |
| 5,135,759 A | 8/1992 | Johnson |
| 5,180,065 A | 1/1993 | Touge et al. |
| 5,194,909 A | 3/1993 | Tycko |
| 5,229,297 A | 7/1993 | Schnipelsky et al. |
| 5,483,469 A | 1/1996 | Van den Engh et al. |
| 5,491,550 A | 2/1996 | Dabbs |
| 5,620,857 A | 4/1997 | Weetall et al. |
| 5,674,743 A | 10/1997 | Ulmer |
| 5,689,109 A | 11/1997 | Schultze |
| 5,752,606 A | 5/1998 | Wilson et al. |
| 5,800,690 A | 9/1998 | Chow et al. |
| 5,837,115 A | 11/1998 | Austin et al. |
| 5,849,178 A | 12/1998 | Holm et al. |
| 5,858,187 A | 1/1999 | Ramsey et al. |
| 5,879,625 A | 3/1999 | Rosianiec et al. |
| 5,966,457 A | 10/1999 | Lemelson |
| 5,976,885 A | 11/1999 | Cohenford |

(Continued)

FOREIGN PATENT DOCUMENTS

| | | |
|---|---|---|
| CA | 1341328 | 12/2001 |
| CN | 2125369 U | 12/1992 |

(Continued)

OTHER PUBLICATIONS

Malek, M., "flowDensity: reproducing manual gating of flow cytometry data by automated density-based cell population identification," et al., Bioinformatics 31(4): 606-607. doi: 10.1093/bioinformatics/btu677. Epub Oct. 16, 2014. (Year: 2014).*

(Continued)

*Primary Examiner* — G. Steven Vanni
(74) *Attorney, Agent, or Firm* — NGUYEN TARBET IP LAW

(57) ABSTRACT

Systems and methods are provided for identification and discrimination of subpopulations within a mixture of particles. The systems and methods implement continuous calibration of the classification of particles within the mixture to provide consistency in operation and to reduce inter- and intra-batch processing variation. The systems and methods produce advantageously sorted particle products.

19 Claims, No Drawings

(56) References Cited

U.S. PATENT DOCUMENTS

| | | |
|---|---|---|
| 5,985,216 A | 11/1999 | Rens et al. |
| 6,008,010 A | 12/1999 | Greenberger et al. |
| 6,053,856 A | 4/2000 | Hlavinka |
| 6,071,442 A | 6/2000 | Dean et al. |
| 6,146,897 A | 11/2000 | Cohenford et al. |
| 6,159,739 A | 12/2000 | Weigl et al. |
| 6,159,749 A | 12/2000 | Yagang et al. |
| 6,171,865 B1 | 1/2001 | Weigl et al. |
| 6,185,664 B1 | 2/2001 | Jeddeloh |
| 6,213,151 B1 | 4/2001 | Jacobson et al. |
| H1960 H | 6/2001 | Conrad et al. |
| 6,368,871 B1 | 4/2002 | Christel et al. |
| 6,416,190 B1 | 7/2002 | Grier et al. |
| 6,416,959 B1 | 7/2002 | Giuliano et al. |
| 6,432,630 B1 | 8/2002 | Blankenstein |
| 6,451,264 B1 | 9/2002 | Bhullar et al. |
| 6,473,171 B1 | 10/2002 | Buttry et al. |
| 6,494,230 B2 | 12/2002 | Chow |
| 6,506,609 B1 | 1/2003 | Wada |
| 6,519,032 B1 | 2/2003 | Kuebler et al. |
| 6,519,954 B1 | 2/2003 | Prien et al. |
| 6,524,860 B1 | 2/2003 | Seidel et al. |
| 6,540,895 B1 | 4/2003 | Spence et al. |
| 6,549,275 B1 | 4/2003 | Cabuz et al. |
| 6,592,821 B1 | 7/2003 | Wada et al. |
| 6,637,463 B1 | 10/2003 | Lei et al. |
| 6,674,525 B2 | 1/2004 | Bardell et al. |
| 6,727,451 B1 | 4/2004 | Fuhr et al. |
| 6,808,075 B2 | 10/2004 | Böhm et al. |
| 6,833,542 B2 | 12/2004 | Wang et al. |
| 6,838,056 B2 | 1/2005 | Foster |
| 6,841,388 B2 | 1/2005 | Dukor et al. |
| 6,853,654 B2 | 2/2005 | Mcdonald et al. |
| 6,877,528 B2 | 4/2005 | Gilbert et al. |
| 6,944,324 B2 | 9/2005 | Tran et al. |
| 6,976,590 B2 | 12/2005 | Deshpande et al. |
| 7,029,430 B2 | 4/2006 | Hlavinka et al. |
| 7,069,943 B2 | 7/2006 | Gilbert et al. |
| 7,092,154 B2 | 8/2006 | Yasuda et al. |
| 7,104,405 B2 | 9/2006 | Böhm et al. |
| 7,195,920 B2 | 3/2007 | Seidel et al. |
| 7,208,265 B1 | 4/2007 | Schenk |
| 7,241,988 B2 | 7/2007 | Gruber et al. |
| 7,276,701 B2 | 10/2007 | Lendl |
| 7,298,478 B2 | 11/2007 | Gilbert et al. |
| 7,300,803 B2 | 11/2007 | Lin et al. |
| 7,311,476 B2 | 12/2007 | Gilbert et al. |
| 7,312,085 B2 | 12/2007 | Chou et al. |
| 7,355,696 B2 | 4/2008 | Mueth et al. |
| 7,355,699 B2 | 4/2008 | Gilbert et al. |
| 7,466,734 B1 | 12/2008 | Day et al. |
| 7,472,794 B2 | 1/2009 | Oakey et al. |
| 7,482,577 B2 | 1/2009 | Gruber et al. |
| 7,492,522 B2 | 2/2009 | Gilbert et al. |
| 7,524,681 B2 | 4/2009 | Wolf et al. |
| 7,569,788 B2 | 8/2009 | Deshpande et al. |
| 7,576,861 B2 | 8/2009 | Gilbert et al. |
| 7,584,857 B2 | 9/2009 | Böhm et al. |
| 7,611,309 B2 | 11/2009 | Gilbert et al. |
| 7,670,471 B2 | 3/2010 | Quake et al. |
| 7,697,576 B2 | 4/2010 | Maier et al. |
| 7,760,351 B2 | 7/2010 | Cox et al. |
| 7,820,425 B2 | 10/2010 | Schenk |
| 7,826,509 B2 | 11/2010 | Belkin et al. |
| 7,956,328 B2 | 6/2011 | Sundaram et al. |
| 7,963,399 B2 | 6/2011 | Böhm et al. |
| 7,997,831 B2 | 8/2011 | Gilbert et al. |
| 8,032,200 B2 | 10/2011 | Tearney et al. |
| 8,080,422 B2 | 12/2011 | Neas et al. |
| 8,123,044 B2 | 2/2012 | Johnson et al. |
| 8,149,402 B2 | 4/2012 | Rich |
| 8,158,122 B2 | 4/2012 | Hampson et al. |
| 8,173,001 B2 | 5/2012 | Quake et al. |
| 8,174,394 B2 | 5/2012 | Ridder et al. |
| 8,198,092 B2 | 6/2012 | Durack et al. |
| 8,206,987 B2 | 6/2012 | Durack et al. |
| 8,209,987 B2 | 7/2012 | Hautman et al. |
| 8,210,209 B2 | 7/2012 | Gilbert et al. |
| 8,277,764 B2 | 10/2012 | Gilbert et al. |
| 8,388,822 B2 | 3/2013 | Quake et al. |
| 8,408,399 B2 | 4/2013 | Böhm et al. |
| 8,502,148 B2 | 8/2013 | Wagner et al. |
| 8,529,161 B2 | 9/2013 | Gilbert et al. |
| 8,563,325 B1 | 10/2013 | Bartsch et al. |
| 8,567,608 B2 | 10/2013 | Deshpande et al. |
| 8,569,069 B2 | 10/2013 | Durack |
| 8,623,295 B2 | 1/2014 | Gilbert et al. |
| 8,727,131 B2 | 5/2014 | Deshpande et al. |
| 8,731,860 B2 | 5/2014 | Charles et al. |
| 8,863,962 B2 | 10/2014 | Johnson et al. |
| 8,941,062 B2 | 1/2015 | Wagner et al. |
| 8,961,904 B2 | 2/2015 | Xia et al. |
| 8,964,184 B2 | 2/2015 | Gilbert et al. |
| 8,981,298 B2 | 3/2015 | Wagner et al. |
| 9,000,357 B2 | 4/2015 | Mueth et al. |
| 9,003,869 B2 | 4/2015 | Wagner et al. |
| 9,011,797 B2 | 4/2015 | Gilbert et al. |
| 9,109,195 B2 | 8/2015 | Zimmermann et al. |
| 9,140,690 B2 | 9/2015 | Mueth et al. |
| 9,255,874 B2 | 2/2016 | Sharpe et al. |
| 9,260,693 B2 | 2/2016 | Johnson et al. |
| 9,335,247 B2 | 5/2016 | Sharpe et al. |
| 9,335,295 B2 | 5/2016 | Mueth et al. |
| 9,339,850 B2 | 5/2016 | Deshpande et al. |
| 9,365,822 B2 | 6/2016 | Seidel et al. |
| 9,377,400 B2 | 6/2016 | Wagner et al. |
| 9,446,912 B2 | 9/2016 | Gilbert et al. |
| 9,485,984 B2 | 11/2016 | Burbank et al. |
| 9,550,215 B2 | 1/2017 | Deshpande et al. |
| 9,588,100 B2 | 3/2017 | Appleyard et al. |
| 9,618,442 B2 | 4/2017 | Sharpe et al. |
| 9,683,922 B2 | 6/2017 | Wagner et al. |
| D791,338 S | 7/2017 | Morkos et al. |
| 9,752,976 B2 | 9/2017 | Gilbert et al. |
| 9,781,918 B2 | 10/2017 | Zimmermann et al. |
| 9,802,767 B2 | 10/2017 | Gilbert et al. |
| 9,823,252 B2 | 11/2017 | Gilbert et al. |
| 9,835,552 B2 | 12/2017 | Wagner |
| D815,754 S | 4/2018 | Morkos et al. |
| 9,943,847 B2 | 4/2018 | Gilbert et al. |
| 9,964,968 B2 | 5/2018 | Sharpe et al. |
| 10,025,322 B2 | 7/2018 | Lofstrom et al. |
| 10,029,283 B2 | 7/2018 | Deshpande et al. |
| 10,175,159 B2 | 1/2019 | Wagner et al. |
| 10,180,388 B2 | 1/2019 | Wagner |
| 10,216,144 B2 | 2/2019 | Mueth et al. |
| 10,315,194 B2 | 6/2019 | Akiyama et al. |
| 11,187,224 B2 | 11/2021 | Xia et al. |
| 11,193,879 B2 | 12/2021 | Wagner et al. |
| 11,243,494 B2 | 2/2022 | Mueth et al. |
| 2002/0027649 A1 | 3/2002 | Chudner |
| 2002/0042042 A1 | 4/2002 | Fahy |
| 2002/0058332 A1 | 5/2002 | Quake et al. |
| 2002/0106716 A1 | 8/2002 | Leboeuf et al. |
| 2002/0115208 A1 | 8/2002 | Mitchell et al. |
| 2002/0176069 A1 | 11/2002 | Hansen et al. |
| 2002/0198928 A1 | 12/2002 | Bukshpan et al. |
| 2003/0007894 A1 | 1/2003 | Wang et al. |
| 2003/0032204 A1 | 2/2003 | Nalt et al. |
| 2003/0047676 A1 | 3/2003 | Grier et al. |
| 2003/0054365 A1 | 3/2003 | Xu et al. |
| 2003/0054558 A1 | 3/2003 | Kurabayashi et al. |
| 2003/0068646 A1 | 4/2003 | Singh et al. |
| 2003/0113709 A1 | 6/2003 | Alivisatos et al. |
| 2003/0175944 A1 | 9/2003 | Yang et al. |
| 2003/0175980 A1 | 9/2003 | Hayenga et al. |
| 2003/0186426 A1 | 10/2003 | Brewer et al. |
| 2004/0043506 A1 | 3/2004 | Haussecker et al. |
| 2004/0079893 A1 | 4/2004 | Dietz et al. |
| 2004/0089798 A1 | 5/2004 | Gruber et al. |
| 2004/0144648 A1 | 7/2004 | Jacobson et al. |
| 2004/0161772 A1 | 8/2004 | Bohm et al. |
| 2004/0166504 A1 | 8/2004 | Rossier et al. |
| 2004/0206399 A1 | 10/2004 | Heller et al. |

(56) References Cited

U.S. PATENT DOCUMENTS

| | | |
|---|---|---|
| 2004/0217297 A1 | 11/2004 | Moses et al. |
| 2004/0229349 A1 | 11/2004 | Daridon |
| 2004/0266022 A1 | 12/2004 | Sundararajan et al. |
| 2005/0037471 A1 | 2/2005 | Liu et al. |
| 2005/0061962 A1 | 3/2005 | Mueth et al. |
| 2005/0103690 A1 | 5/2005 | Kawano et al. |
| 2005/0112541 A1 | 5/2005 | Durack et al. |
| 2005/0121604 A1 | 6/2005 | Mueth et al. |
| 2005/0123450 A1 | 6/2005 | Gilbert |
| 2005/0124869 A1 | 6/2005 | Hefti et al. |
| 2005/0148085 A1 | 7/2005 | Larsen |
| 2005/0153354 A1 | 7/2005 | Gilmanshin |
| 2005/0190372 A1 | 9/2005 | Dogariu |
| 2005/0196876 A1 | 9/2005 | Chan et al. |
| 2005/0207940 A1 | 9/2005 | Butler et al. |
| 2005/0207943 A1 | 9/2005 | Puzey |
| 2006/0013270 A1 | 1/2006 | Yumoto et al. |
| 2006/0035273 A1 | 2/2006 | Quake et al. |
| 2006/0043301 A1 | 3/2006 | Mantele et al. |
| 2006/0058167 A1 | 3/2006 | Regusa et al. |
| 2006/0078888 A1 | 4/2006 | Griffiths |
| 2006/0105453 A1 | 5/2006 | Brenan et al. |
| 2006/0152707 A1 | 7/2006 | Kanda |
| 2006/0170912 A1 | 8/2006 | Mueth et al. |
| 2006/0252047 A1 | 11/2006 | Ekstrom et al. |
| 2006/0257089 A1 | 11/2006 | Mueth et al. |
| 2006/0263829 A1 | 11/2006 | Evans et al. |
| 2007/0009386 A1 | 1/2007 | Padmanabhan et al. |
| 2007/0078348 A1 | 4/2007 | Holman |
| 2007/0114172 A1 | 5/2007 | Mueth et al. |
| 2007/0128082 A1 | 6/2007 | Yang et al. |
| 2007/0207551 A1 | 9/2007 | Glensbjerg |
| 2007/0247620 A1 | 10/2007 | Koo |
| 2007/0248958 A1 | 10/2007 | Jovanovich et al. |
| 2007/0255362 A1 | 11/2007 | Levinson |
| 2008/0003685 A1 | 1/2008 | Goix et al. |
| 2008/0014574 A1 | 1/2008 | Viator et al. |
| 2008/0021674 A1 | 1/2008 | Puskas |
| 2008/0069733 A1 | 3/2008 | Maltezo et al. |
| 2008/0144037 A1 | 6/2008 | Mueth et al. |
| 2008/0166188 A1 | 7/2008 | Gilbert et al. |
| 2008/0195020 A1 | 8/2008 | Cabuz et al. |
| 2008/0213821 A1 | 9/2008 | Liu et al. |
| 2008/0248966 A1 | 10/2008 | Hansen et al. |
| 2008/0261295 A1 | 10/2008 | Butler et al. |
| 2008/0292555 A1 | 11/2008 | Ye et al. |
| 2008/0299013 A1 | 12/2008 | Trieu et al. |
| 2008/0309919 A1 | 12/2008 | Birmingham et al. |
| 2008/0311005 A1 | 12/2008 | Kim et al. |
| 2009/0004652 A1 | 1/2009 | Rubin et al. |
| 2009/0029870 A1 | 1/2009 | Ward et al. |
| 2009/0032449 A1 | 2/2009 | Mueth et al. |
| 2009/0042241 A1 | 2/2009 | Yu-Chong et al. |
| 2009/0051912 A1 | 2/2009 | Salazar et al. |
| 2009/0114285 A1 | 5/2009 | Hashimoto et al. |
| 2009/0125242 A1 | 5/2009 | Choi et al. |
| 2009/0141279 A1 | 6/2009 | Hillmer |
| 2009/0156932 A1 | 6/2009 | Zharov |
| 2009/0170149 A1 | 7/2009 | Viator et al. |
| 2009/0176271 A1 | 7/2009 | Durack et al. |
| 2009/0201504 A1 | 8/2009 | Ho et al. |
| 2009/0225319 A1 | 9/2009 | Lee et al. |
| 2009/0281250 A1 | 11/2009 | DeSimone et al. |
| 2009/0290156 A1 | 11/2009 | Popescu et al. |
| 2010/0044570 A1 | 2/2010 | McGill et al. |
| 2010/0068723 A1 | 3/2010 | Jovanovich et al. |
| 2010/0079516 A1 | 4/2010 | Nakazawa |
| 2010/0167336 A1 | 7/2010 | Son et al. |
| 2010/0171954 A1 | 7/2010 | Quake et al. |
| 2010/0216208 A1 | 8/2010 | Mueth et al. |
| 2010/0248362 A1 | 9/2010 | Durack et al. |
| 2010/0330693 A1 | 12/2010 | Chapin et al. |
| 2011/0001963 A1 | 1/2011 | Durack |
| 2011/0003303 A1 | 1/2011 | Pagano et al. |
| 2011/0003324 A1 | 1/2011 | Durack |
| 2011/0003325 A1 | 1/2011 | Durack |
| 2011/0003330 A1 | 1/2011 | Durack |
| 2011/0008764 A1 | 1/2011 | Silva et al. |
| 2011/0008767 A1 | 1/2011 | Durack |
| 2011/0008817 A1 | 1/2011 | Durack |
| 2011/0008818 A1 | 1/2011 | Durack |
| 2011/0075928 A1 | 3/2011 | Jeong et al. |
| 2011/0076712 A1 | 3/2011 | Gilligan et al. |
| 2011/0090500 A1 | 4/2011 | Hu et al. |
| 2011/0096327 A1 | 4/2011 | Papautsky et al. |
| 2011/0190146 A1 | 8/2011 | Boehm et al. |
| 2011/0223654 A1 | 9/2011 | Holman et al. |
| 2011/0256523 A1 | 10/2011 | Mendele et al. |
| 2011/0263747 A1 | 10/2011 | Doyle et al. |
| 2011/0294139 A1 | 12/2011 | Takeda |
| 2012/0009619 A1 | 1/2012 | Gilbert et al. |
| 2012/0028366 A1 | 2/2012 | Krager et al. |
| 2012/0033220 A1 | 2/2012 | Kotidis et al. |
| 2012/0033697 A1 | 2/2012 | Goyal et al. |
| 2012/0081709 A1 | 4/2012 | Durack |
| 2012/0082362 A1 | 4/2012 | Diem et al. |
| 2012/0107805 A1 | 5/2012 | Neas et al. |
| 2012/0122084 A1 | 5/2012 | Wagner et al. |
| 2012/0138152 A1 | 6/2012 | Villarruel et al. |
| 2012/0183947 A1 | 7/2012 | Mueth et al. |
| 2012/0196356 A1 | 8/2012 | Wagner et al. |
| 2012/0199741 A1 | 8/2012 | Wagner et al. |
| 2012/0199742 A1 | 8/2012 | Wagner et al. |
| 2012/0202237 A1 | 8/2012 | Sedoglavich et al. |
| 2012/0202277 A1 | 8/2012 | Wagner et al. |
| 2012/0202278 A1 | 8/2012 | Wagner et al. |
| 2012/0204628 A1 | 8/2012 | Wagner et al. |
| 2012/0225474 A1 | 9/2012 | Wagner et al. |
| 2012/0225475 A1 | 9/2012 | Wagner et al. |
| 2012/0273054 A1 | 11/2012 | Lou et al. |
| 2012/0287419 A1 | 11/2012 | Sharpe et al. |
| 2012/0295263 A1 | 11/2012 | Cantor et al. |
| 2012/0307244 A1 | 12/2012 | Sharpe et al. |
| 2013/0121877 A1 | 5/2013 | Ono |
| 2013/0164731 A1 | 6/2013 | Cimino et al. |
| 2013/0164773 A1 | 6/2013 | Bardell et al. |
| 2013/0200277 A1 | 8/2013 | Li et al. |
| 2013/0224843 A1 | 8/2013 | Evans et al. |
| 2013/0252237 A1 | 9/2013 | Wagner |
| 2013/0295602 A1 | 11/2013 | Fowler |
| 2013/0313170 A1 | 11/2013 | Bohm et al. |
| 2014/0033808 A1 | 2/2014 | Ding et al. |
| 2014/0050540 A1 | 2/2014 | Gilbert et al. |
| 2014/0091014 A1 | 4/2014 | Wagner et al. |
| 2014/0127688 A1 | 5/2014 | Umbarger et al. |
| 2014/0224710 A1 | 8/2014 | Di Carlo et al. |
| 2014/0273192 A1 | 9/2014 | Sharpe |
| 2014/0287243 A1 | 9/2014 | Weber et al. |
| 2014/0318645 A1 | 10/2014 | Koksal |
| 2014/0339446 A1 | 11/2014 | Yamamoto et al. |
| 2014/0361148 A1 | 12/2014 | Popescu et al. |
| 2015/0064694 A1 | 3/2015 | Sadri |
| 2015/0114093 A1 | 4/2015 | Appleyard et al. |
| 2015/0192511 A1 | 7/2015 | Wagner et al. |
| 2015/0198517 A1 | 7/2015 | Simpson et al. |
| 2015/0276588 A1 | 10/2015 | Marshall et al. |
| 2016/0004060 A1 | 1/2016 | Simpson et al. |
| 2016/0123858 A1 | 5/2016 | Kapur et al. |
| 2016/0199835 A1 | 7/2016 | Tachibana et al. |
| 2016/0303563 A1 | 10/2016 | Granier et al. |
| 2016/0368003 A1 | 12/2016 | Vester et al. |
| 2017/0016813 A1 | 1/2017 | Wagner et al. |
| 2017/0181425 A1 | 6/2017 | Burbank et al. |
| 2017/0307505 A1 | 10/2017 | Vrane et al. |
| 2017/0333902 A1 | 11/2017 | Masaeli et al. |
| 2018/0266937 A1 | 9/2018 | de Wagenaar et al. |
| 2019/0025212 A1 | 1/2019 | Evans |
| 2019/0040356 A1 | 2/2019 | Durack et al. |
| 2019/0071725 A1 | 3/2019 | Roti-Roti et al. |
| 2019/0160439 A1 | 5/2019 | Muto et al. |
| 2019/0187044 A1 | 6/2019 | Appleyard et al. |
| 2019/0382720 A1 | 12/2019 | Savage et al. |
| 2019/0390164 A1 | 12/2019 | Morjal et al. |

(56) References Cited

U.S. PATENT DOCUMENTS

| | | |
|---|---|---|
| 2020/0070152 A1 | 3/2020 | Kasai et al. |
| 2022/0025443 A1 | 1/2022 | Korani et al. |
| 2022/0026341 A1 | 1/2022 | Appleyard et al. |

FOREIGN PATENT DOCUMENTS

| | | |
|---|---|---|
| CN | 1482369 | 3/2004 |
| CN | 1886315 | 12/2006 |
| CN | 101189504 | 5/2008 |
| CN | 104862273 A | 8/2015 |
| CN | 1910441 A | 2/2017 |
| CN | 105940301 A | 6/2017 |
| CN | 101201313 A | 6/2018 |
| CN | 109022562 A | 12/2018 |
| CN | 109221081 A | 1/2019 |
| CN | 109497040 A | 3/2019 |
| CN | 109517787 A | 3/2019 |
| EP | 0057907 | 8/1982 |
| EP | 0282994 | 9/1988 |
| EP | 0679325 | 7/1994 |
| EP | 0471758 | 9/1996 |
| FR | 2798557 | 3/2001 |
| GB | 502971 | 5/1939 |
| GB | 2507959 | 5/2014 |
| JP | 57-131451 | 8/1982 |
| JP | 58090513 | 5/1983 |
| JP | S 64-26125 | 1/1989 |
| JP | 64074451 | 3/1989 |
| JP | 02105041 | 4/1990 |
| JP | 03297385 | 12/1991 |
| JP | H0526799 | 2/1993 |
| JP | 06265452 | 9/1994 |
| JP | 06327494 | 11/1994 |
| JP | 07024309 | 1/1995 |
| JP | 07286953 | 10/1995 |
| JP | 2552582 | 11/1996 |
| JP | H10512952 | 12/1998 |
| JP | H11508182 | 7/1999 |
| JP | 2000146819 | 5/2000 |
| JP | 2000512541 | 9/2000 |
| JP | 2001504936 | 4/2001 |
| JP | 2002503334 | 1/2002 |
| JP | 2002153260 | 5/2002 |
| JP | 2003106980 | 4/2003 |
| JP | 2003515738 | 5/2003 |
| JP | 2004093553 | 3/2004 |
| JP | 2005502482 | 1/2005 |
| JP | 2005530986 | 10/2005 |
| JP | 2006524054 | 10/2006 |
| JP | 2007-514522 A | 6/2007 |
| JP | 2007148981 | 6/2007 |
| JP | 2007514522 | 6/2007 |
| JP | 2007515936 | 6/2007 |
| JP | 2008533440 | 8/2008 |
| JP | 2008261295 A1 | 10/2008 |
| JP | 2009085872 A | 4/2009 |
| JP | 2009115672 A | 5/2009 |
| JP | 2009162660 A | 7/2009 |
| JP | 2010117197 | 5/2010 |
| JP | 2010151777 | 7/2010 |
| JP | 2010190680 | 9/2010 |
| JP | 2011145185 | 7/2011 |
| JP | 2014503195 | 2/2014 |
| WO | WO9622521 | 7/1996 |
| WO | WO9700442 | 1/1997 |
| WO | WO1997030338 A1 | 8/1997 |
| WO | WO9739338 | 10/1997 |
| WO | WO9747390 | 12/1997 |
| WO | WO9810267 | 3/1998 |
| WO | WO99/39223 | 8/1999 |
| WO | WO20000070080 A1 | 11/2000 |
| WO | WO0118400 | 3/2001 |
| WO | WO0131315 | 5/2001 |
| WO | WO2001040766 | 6/2001 |
| WO | WO0185913 | 11/2001 |
| WO | WO2002006778 A1 | 1/2002 |
| WO | WO200241906 | 5/2002 |
| WO | WO2002081183 A1 | 10/2002 |
| WO | WO02087792 | 11/2002 |
| WO | WO03024163 | 3/2003 |
| WO | WO03062867 | 7/2003 |
| WO | WO03078065 A1 | 9/2003 |
| WO | WO2003078065 | 9/2003 |
| WO | WO2004012133 | 2/2004 |
| WO | WO2004029221 | 4/2004 |
| WO | WO2004043506 A1 | 5/2004 |
| WO | WO2004088283 | 10/2004 |
| WO | WO20040088283 A1 | 10/2004 |
| WO | WO2005023391 | 3/2005 |
| WO | WO2005075629 | 8/2005 |
| WO | WO20050075629 A1 | 8/2005 |
| WO | WO2006119806 | 11/2006 |
| WO | WO20060119806 A1 | 11/2006 |
| WO | WO2007008495 A2 | 1/2007 |
| WO | WO2007133710 A2 | 11/2007 |
| WO | WO2008114458 | 9/2008 |
| WO | WO2008126064 A2 | 10/2008 |
| WO | WO2008130977 A1 | 10/2008 |
| WO | WO2009032449 A1 | 3/2009 |
| WO | WO2009134395 | 11/2009 |
| WO | WO2010129441 | 11/2010 |
| WO | WO2012068287 A2 | 5/2012 |
| WO | WO2012112641 | 8/2012 |
| WO | WO20120112641 A1 | 8/2012 |
| WO | WO20130018273 A1 | 2/2013 |
| WO | WO2013173446 | 11/2013 |
| WO | WO2005037471 A1 | 9/2014 |
| WO | 2015038494 A1 | 3/2015 |
| WO | WO2015063552 | 5/2015 |
| WO | WO2018047011 A2 | 3/2018 |
| WO | WO2018151680 A1 | 8/2018 |
| WO | 2019236569 A1 | 12/2019 |
| WO | WO2020092321 A1 | 5/2020 |
| WO | WO2020182193 A1 | 9/2020 |

OTHER PUBLICATIONS

Johnson, Lawrence A., James P. Flook, and Harold W. Hawk. "Sex preselection in rabbits: live births from X and Y sperm separated by DNA and cell sorting." Biology of reproduction 41.2 (1989): 199-203.*

USPTO, "Non-Final Office Action," issued in connection with U.S. Appl. No. 17/403,642, dated Nov. 29, 2021, 13 pages.

Intellectual Property India, "Examination Report," issued in connection with Indian Patent Application No. 201917009874, mailed Nov. 25, 2021, 6 pages.

Australian Office Action, Application No. 2017323502, dated Oct. 22, 2021, 6 pages.

Altendorf et al., "Results Obtained Using a Prototype Microfluidics-Based Hematology Analyzer," in Proceedings of the microTAS 1998 Symposium, 73-76 (Oct. 1998).

Nieuwenhuis et al., "Particle-Shape Sensing-Elements for Integrated Flow Cytometer," in Proceedings of the microTAS 2001 Symposium, 357-358 (Oct. 21, 2001).

Nieuwenhuis et al. "Virtual Flow Channel: A Novel Micro-fluidics System with Orthogonal, Dynamic Control of Sample Flow Dimensions," in Proceedings of the microTAS 2002 Symposium, vol. 1, 103-105 (Nov. 3, 2002).

Nieuwenhuis, J., et al. "Integrated flow-cells for novel adjustable sheath flows." Lab Chip, 2003, 3, 56-61 (Mar. 2003.

Shoji, S., et al. "Design and fabrication of micromachined chemical/biochemical systems." RIKEN Rev., vol. 36, pp. 8-11, 2001.

Lin, C., et al. "A Novel Microflow Cytometer with 3-dimensional Focusing Utilizing Dielectrophoretic and Hydrodynamic Forces." The Sixteenth Annual International Conference on Micro Electro Mechanical Systems, 2003. MEMS-03 Kyoto. IEEE, Kyoto, Japan, 2003, pp. 439-442.

Miyake et al., "A Development of Micro Sheath Flow Chamber," in Proceedings of the IEEE Micro Electro Mechanical Systems Workshop 1991, 265-270 (Jan. 1991).

(56) References Cited

OTHER PUBLICATIONS

Tashiro et al., "Design and Simulation of Particles and Biomolecules Handling Micro Flow Cells with Three-Dimensional Sheath Flow," in Proceedings of the microTAS 2000 Symposium, 209-212 (May 14, 2000).
Weigl, B. et al. "Design and Rapid Prototyping of Thin-Film Laminate-Based Microfluidic Devices." Biomedical Microdevices, 3:4, pp. 267-274, 2001.
Blankenstein, G. et al. "Modular concept of a laboratory on a chip for chemical and biochemical analysis." Biosensors & Bioelectronics, vol. 13. No 3-4, pp. 427-438, 1998.
Shapiro, Practical Flow Cytometry, 15-17, 133-135 (3rd ed. 1995).
Shapiro, Practical Flow Cytometry, 55-57, 166-169 (4th ed. 2003).
International Search Report for PCT Patent Application No. PCT/IB2014/001425 dated Apr. 28, 2015.
Herweijer, H. et al., "High Speed Photodamage Cell Selection Using Bromodeoxyuridine/Hoechst 33342 Photosensitized Cell Killing", Radiobiological Institute TNO, Rotterdam, The Netherlands, Jun. 1, 1987.
Johnson, L.A., et al., "Sex Preselection: High-Speed Flow Cytometric Sorting of X and Y Sperm for Maximum Efficiency" U.S. Dept. of Agriculture, Beltsville, MD, Sep. 23, 1999.
Bazyer H., et al., "Views and Reviews—Compact 151W Green Laser with U-Type Resonator for Prostate Surgery", Optics & Laser Technology, vol. 47, Apr. 27, 2013, 237-241.
Keij, J. et al., "High-Speed Photodamage Cell Sorting: An Evaluation of the ZAPPER Prototype", Methods in Cell Biology, 1994; pp. 371-386, vol. 42, Chapter 22, Academic Press, Inc.
International Search Report and Written Opinion issued on Mar. 7, 2014 in connection with PCT/US2013/050669.
Kachel, V, et al., "Uniform Lateral Orientation, caused by Flow Forces, of Flat Particles in Flow-Through Systems", The Journal of Histochemistry and Cytochemistry, vol. 25, No. 7, pp. 774-780, 1977.
Notice of Allowance issued in U.S. Appl. No. 13/943,322 on Sep. 12, 2014.
Fulwler, M., "Hydrodynamic Orientation of Cells", The Journal of Histochemistry and Cytochemistry, vol. 25, No. 7, pp. 781-783, 1977.
Khodjakov A., et al., "A Synergy of Technologies: Combining Laser Microsurgery with Green Fluorescent Protein Tagging", Cell Motility and the Cytoskeleton 38:311-317 (1997), Division of Molecular Medicine and Department of Biomedical Sciences, Albany, New York.
Canadian Office Action, Application No. 2,929,275, mailed May 4, 2020, 8 pages.
Australian Office Action, Application No. 2019202882, mailed Mar. 26, 2020, 3 pages.
Brazilian Office Action, Application No. BR122017012966-0, mailed Jun. 2, 2020, 6 pages.
Japan Patent Office, "Reconsideration Report by Examiner before Appeal," issued in connection with Japanese Patent Application No. 2016-551082, mailed Jul. 12, 2019, 17 pages. 20090114285.
Intellectual Property India, "Examination Report," issued in connection with Indian Patent Application No. 3425/DELNP/2015, mailed Jan. 20, 2020, 6 pages.
European Patent Office, "Extended European Search Report," issued in connection with patent application No. 19182993.6, mailed Oct. 21, 2019, 11 pages.
China National Intellectual Property Administration, "Second Office Action," issued in connection with Chinese Patent Application No. 201480071952.0, mailed Nov. 26, 2018, 34 pages.
China National Intellectual Property Administration, "Decision of Rejection," issued in connection with Chinese Patent Application No. 201480071952.0, mailed Mar. 4, 2019, 19 pages.
IP Australia, "Examination Report No. 1 for Standard Patent Application," issued in connection with Australian Patent Application No. 2014343391, mailed Sep. 4, 2018, 3 pages.
International Preliminary Report on Patentability, issued in connection with application PCT/IB/001425, May 3, 2016, 11 pages.

Japan Patent Office, "Non Final Notice of Reasons for Rejection," issued in connection with Japanese Patent Application No. 2016-551082, mailed Apr. 24, 2018, 5 pages.
New Zealand IP Office, "First Examination Report," issued in connection with New Zealand Patent Application No. 720575, mailed Sep. 9, 2016, 5 pages.
New Zealand IP Office, "Further Examination Report," issued in connection with New Zealand Patent Application No. 720575, mailed Apr. 28, 2017, 3 pages.
State Intellectual Property Office of People's Republic of China, "Notification of First Office Action," issued in connection with Chinese Patent Application No. 201480071952.0, mailed Mar. 16, 2018, 31 pages.
New Zealand IP Office, "Further Examination Report," issued in connection with New Zealand Patent Application No. 735496, mailed Aug. 31, 2018, 2 pages.
Drobnis et al., Cold Shock Damage is due to Lipid Phase Transitions in Cell Membranes: A Demonstration Using Sperm as a Model, The Journal of Experimental Zoology, 1993, 265:432-437.
Way et al., Comparison of four staining methods for evaluating acrosome status and viability of ejaculated and cauda epididymal bull spermatozoa, Theriogenology, 1995, 43(8): 1301-1316.
Marian et al., Hypo-osmotic Shock Induces an Osmolality-dependent Permeabilization and Structural Changes in the Membrane of Carp Sperm, 1993, 41(2):291-297.
Molecular Probes Inc., Product Information, Influx Pinocylic Cell-Loading Reagent (1-14402), Revised Feb. 1, 2001, 1-7.
Parks, Processing and Handling Bull Semen for Artificial Insemination—Don't Add Insult to Injuryl, Department of Animal Sciences, Cornell University, 2001, retrieved on May 29, 2015, retrieved from the internet: http://www/ansci.cornell.edu/bullsemen.pdf.
Mammal (Online Datasheet), Wikipedia, 2003, retrieved on Aug. 13, 2018, retrieved from internet: http:/web.archive.org/web/20031230110838/hllps://en.wikipedia.org/wiki/Mammal.
International Searching Authority, "International Search Report and Written Opinion," issued in connection with International Patent Application No. PCT/IB2016/000295, mailed Oct. 14, 2016, 19 pages.
International Bureau, "International Preliminary Report on Patentability," issued in connection with International Patent Application No. PCT/IB2016/000295, mailed Aug. 31, 2017, 14 pages.
Japan Patent Office, "Office Action," issued in connection with Japanese Patent Application No. 2017-543990, mailed Jul. 31, 2019, 23 pages.
Di Carlo et al. "Equilibrium Separation and Filtration of Particles Using Differential Inertial Focusing" Anal. Chem. 2008, 30, 2204-2211 (Year: 2008).
Hydraulic Diameter, Neutrium, Apr. 1, 2012, https://neutrium.net/fluid-flow/hydraulic-diameter/ (Year: 2012).
Gossett et al. "Particle Focusing Mechanisms in Curving Confined Flows" Anal. Chem. 2009, 81, 8459-8465 (Year: 2009).
Di Carlo et al. "Continuous inertial focusing, ordering, and separation of particles in microchannels" PNAS Nov. 27, 2007 vol. 104 No. 48 18893 (Year: 2007).
Japan Patent Office; "Notice of Reasons for Refusal," issued in connection with Japanese Patent Application No. 2019-088655, mailed Feb. 18, 2020, 5 pages.
New Zealand IP Office, "First Examination Report," issued in connection with New Zealand Patent Application No. 751869, mailed Aug. 12, 2022, 3 pages.
Canadian Office Action, Application No. 3,034,007, mailed Aug. 25, 2022, 3 pages.
USPTO, "Final Office Action," issued in connection with U.S. Appl. No. 16/741,608, dated Oct. 21, 2021, 11 pages.
Trial Transcript, Sep. 5, 2019 (a.m.); *ABS Global, Inc.* v. *Inguran, LLC d/b/a Sexing Technologies*, Case Nos. 17-cv-446 and 14-cv-503, United States District Court for the Western District of Wisconsin.
Brief in Support of ABS Global, Inc. and Genus PLC's Rule 50(8) Motion for Judgment as a Matter of Law and Rule 59 Motion for a New Trial, *ABS Global, Inc.* v. *Inguran, LLC d/b/a Sexing Technologies*, Case No. 14-cv-503, United States District Court for the Western District of Wisconsin. Filed Sep. 2, 2016.

(56) References Cited

OTHER PUBLICATIONS

*Inguran, LLC and XY, LLC's* Response To *ABS Global, Inc. and Genus PLC*'s Rule 50(8) Motion Fof Judgment as a Matter of Law and Rule 59 Motion for New Trial, pp. 9-28, 33-36, 73-74. Filed Sep. 23, 2016.
ST's Response To ABS's Renewed Motion for Judgment as a Matter of Law That the Asserted Claims of The '987 Patent Are Invalid for Lack of Enablement and, in the Alternative, for a New Trial, *ABS Global, Inc. v. Inguran, LLC d/b/a Sexing Technologies*, Case No. 14-cv-503, United States District Court for the Western District of Wisconsin. Filed: Jul. 24, 2020.
Clinical Laboratory Instruments and In Vitro Diagnostic Reagents, Personnel Department of the State Food and Drug Administration, et al., pp. 17-21, China Medical Science and Technology Publishing House, Oct. 31, 2010).
DiCarlo "Continuous inertial focusing, ordering, and separation of particles in microchannels" BioMEMS Resource Center, Center for Engineering in Medicine and Surgical Services, Massachusetts General Hospital, Nov. 27, 2007, PNAS, 18892-18897, vol. 104, No. 48.
DiCarlo "Equilibrium Separation and Filtration of Particles Using Differential Inertial Focusing" BioMEMS Resource Center, Center for Engineering in Medicine and Surgical Services, Massachusetts General Hospital, Anal Chem 2008, 3, 2204-2211.
DiCarlo "Inertial Microfluidics: High-Throughput Focusing and Separation of Cells and Particles" BioMEMS Resource Center, Center for Engineering in Medicine, Massachusetts General Hospital, Twelfth International Conference on Miniaturized Systems for Chemistry and Life Sciences, Oct. 12-16, 2008, San Diego, California, USA.
USPTO, "Non-Final Office Action," issued in connection with U.S. Appl. No. 17/496,614, dated Dec. 21, 2022, 9 pages.
UPSTO, "Non-Final Office Action," issued in connection with U.S. Appl. No. 16/852,303, dated Jan. 9, 2023, 30 pages.
European Patent Office, "European Search Report," issued in connection with European Patent Application No. 20792020.8, mailed Dec. 23, 2022, 10 pages.
Brazilian Office Action, Application No. BR112020023607-1, mailed Dec. 12, 2022, 5 pages.
Ron Bardell et al. "Microfluidic disposables for cellular and chemical detection: CFD model results and fluidic verification experiments," Proc. SPIE 4265, Biomedical Instrumentation Based on Micro- and Nanotechnology, May 21, 2001; doi: 10.1117/12. 427961 Invited Paper: BiOS 2001 The International Symposium on Biomedical Optics, 2001, San Jose, CA, United States, 14 pages.
Japan Patent Office, "Office Action," issued in connection with Japanese Patent Application No. 2022-540313, May 7, 2024, 3 pages.
Maxwell, W.M.C & Johnson, L.A.; Chlortetracycline analysis of boar spermatozoa after incubation, flow cytometric sorting, cooling, or cryopreservation; Molecular Reproduction Development, 46: 408-419 (1997).
Johnson, L.A. et al.; Artificial Insemination of Swine: Fecundity of boar semen stored in Beltsville TS (BTS), Modified Modena (MM), or MR-A and inseminated on one, three and four days after collection; Reproduction in domestic Animals, vol. 23, Issue 2, pp. 49-55 (1988).
Stap, J. et al.; Improving the resolution of cryopreserved X- and Y-Sperm during DNA flow cytometric analysis with the addition of Percoll to quench the fluorescence of dead sperm; Journal of Animal Science, 76: 1896-1902 (1998).
De Leeuw, F.E. et al.; Effects of various cryoprotective agents and membrane-stabilizing compounds on bull sperm membrane integrity after cooling and freezing; Cryobiology, 30, 32-44 (1993).
Jun et al. "Detecting and estimating contamination of human DNA samples in sequencing and array-based genotype data." The American Journal of Human Genetics 91.5 (2012): 839-848.
International Searching Authority, "International Search Report and Written Opinion," issued in connection with International Patent Application No. PCT/US21/56094, mailed Mar. 16, 2022, 22 pages.

USPTO, "Notice of Allowance," issued in connection with U.S. Appl. No. 17/496,469, dated May 10, 2022, 54 pages.
China National Intellectual Property Administration, "Notice of Allowance," issued in connection with Chinese Patent Application No. 201480071952.0, dated Mar. 21, 2022, 3 pages.
Ai-Holy et al., "The Use of Fourier Transform Infrared Spectroscopy to Differentiate *Escherichia coli* O157:H7 from Other Bacteria Inoculated Into Apple Juice," Food Microbiology, vol. 23, 2006, 162-168.
Alberts et al., "Molecular Biology of the Cell, 5th edition," New York: Garland Science, 2008, p. 1293.
Barcot et al., "Investigation of Spermatozoa and Seminal Plasma by Fourier Transform Infrared Spectroscopy," Applied Spectroscopy, vol. 61, No. 3, Mar. 2007, pp. 309-313.
Bassan et al.; "Reflection Contributions to the Dispersion Artefact in FTIR Spectra of Single Biological Cells," Analyst, vol. 134, Apr. 9, 2009, pp. 1171-1175.
Bassan et al.; "Resonant Mie Scattering in Infrared Spectrascopy of Biological Materials-Understanding the Dispersion Artefact'," Analyst, vol. 134, 2009, pp. 1586-1593.
Bassan et al.; "Resonant Mie Scattering {RMieS) Correction of Infrared Spectra From Highly Scattering Biological Samples," Analyst, vol. 135, No. 2, Feb. 2010, pp. 268-277.
Belkin et al.; "Intra-Cavity Absorption Spectroscopy with Narrow-Ridge Microfluidic Quantum Cascade asers, "Applies Express, vol. 15, No. 18, Sep. 3, 2007, pp. 11262-11271.
Boustany et al.; "Microscopic Imaging and Spectroscopy with Scattered Light," Annual Review of Biomedical Engineering, vol. 12, 2010, pp. 285-314.
Chan et al.; "Nondestructive Identification of Individual Leukemia Cells by Laser Trapping Raman Spectroscopy," Analytical Chemistry, vol. 80, No. 6, Mar. 15, 2008, 8 pages.
Chan et al.; "Label-Free Biochemical Characterization of Stem Cells Using Vibrational Spectroscopy," Journal of Biophotonics vol. 2, No. 11, Aug. 5, 2009, pp. 656-668.
Chan et al.; "Label-Free Separation of Human Embryonic Stem Cells {hESCs) and their Cardiac Derivatives using Raman Spectroscopy," Lawrence Livermore Journal, LLNL-JRNL-406938, Sep. 11, 2008, 30 pages.
Chen et al.,; "Synchrotron Infrared Measurements of Protein Phosphorylation in Living Single PC12 Cells during Neuronal Differentiation," Analytical Chemistry, vol. 84, 2012, pp. 4118-4125.
Cheng et al., "Laser-Scanning Coherent Anti-Strokes Raman Scattering Microscopy and Applications to Cell Biology," Biophysical Journal, vol. 83, Jul. 2002, pp. 502-509.
Cho et al., "Passively Driven Integrated Microfluidic System for Separation of Motile Sperm," Analytical Chemistry, vol. 75, Apr. 1, 2003, Abstract.
Cleary et al., "Infrared Surface Plasmon Resonance Biosensor," OSA Biomed, Miami, Florida, Apr. 2010, 6 pages.
Dousseau et al., "On the Spectral Subtraction of Water from the FT-IR Spectra of Aqueous Solutions of Proteins," Applied Spectroscopy, vol. 43, No. 3, 1989, pp. 538-542.
Downes et al., "Optical Spectroscopy for Noninvasive Monitoring of Stem Cell Differentation," Journal of Biomedicine and Biotechnology, vol. 2010, Article ID 101864, 2010, 10 pages.
Ege, "Organic Chemistry: Structure and Reactivity," Fifth Edition, Boston, MA, Houghton Mifflin Company, 2004, pp. 453-457.
European Patent Office, "Extended European Search Report," issued in connection with European Patent Application No. 11841869.8, mailed Feb. 15, 2018, 9 pages.
Fu et al., "A Microfabricated Fluorescence-Activated Cell Sorter," Nature Biotechnology, vol. 17, Nov. 1999, pp. 1109-1111.
Green et al., "Flow Cytometric Determination of Size and Complex Refractive Index for Marine Particles: Comparison with Independent and Bulk Estimates," Applied Optics, vol. 42, No. 3, Jan. 20, 2003, pp. 526-541.
Harvey et al., "Discrimination of Prostate Cancer Cells by Reflection Mode FTIR Photoacoustic Spectroscopy," The Analyst, vol. 132, 2007, pp. 292-295.
Herzenberg et al., "Fluorescence-activated Cell Sorting," Scientific American, vol. 234, Mar. 1976, pp. 108-117.

(56) References Cited

OTHER PUBLICATIONS

Holman et al., "Synchrotron-Based FTIR Spectromicroscopy: Cytotoxicity and Heating Considerations," Journal of Biological Physics, vol. 29, 2003, pp. 275-286.
Holman et al., "IR Spectroscopic Characteristics of Cell Cycle and Cell Death Probed by Synchrotron Radiation Based Fourier Transform IR Spectromicroscopy," Biopolymers (Biospectroscopy) vol. 57, 2000, pp. 329-335.
Holman et al., "Tracking Chemical Changes in a Live Cell: Biomedical Applications of SR-FTIR Spectromicroscopy," Lawrence Berkeley National Laboratory, http://escholarship.org/uc/item/9k185794, Berkeley, CA Jul. 25, 2002, 34 pages.
Huser et al., "Raman Spectroscopy of DNA Packaging in Individual Human Sperm Cells Distinguishes Normal From Abnormal Cells," Journal of Biophotonics, vol. 2, No. 5, 2009, pp. 322-332.
Intel, "Intel C-bank Tunable Laser, Performance and Design," White Paper, May 2003, 14 pages.
International Searching Authority, "International Search Report and Written Opinion," International Patent Application No. PCT/US2013/41123, mailed Aug. 19, 2013, 12 pages.
International Search Authority, "International Preliminary Report on Patentability," International Patent Application No. PCT/US2011/061046, mailed May 30, 2013, 7 pages.
International Searching Authority, "International Preliminary Report on Patentability," International Patent Application No. PCT/US2013/041123, Nov. 18, 2014, 7 pages.
Japan Patent Office, "Office Action," issued in connection with Japanese Patent Application No. 2013-539983, Jul. 8, 2015, 6 pages.
Japan Patent Office, "Office Action," issued in connection with Japanese Patent Application No. 2013-539983, Jul. 2, 2016, 6 pages.
Japan Patent Office, "Office Action," issued in connection with Japanese Patent Application No. 2016-198323, Oct. 2, 2017, 3 pages.
Japan Patent Office, "Office Action," issued in connection with Japanese Patent Application No. 2016-198323, Jul. 25, 2018, 9 pages.
Ibbus et al., "Incidence of Chromosome Aberrations in Mammalian Sperm Stained with Hoechst 33342 and UV-aser Irradiated During Flow Sorting," Mutation Research, vol. 182, 1987, pp. 265-274.
Malone, Jr., "Infrared Microspectroscopy: A Study of the Single Isolated Bread Yeast Cell," Thesis, The Ohio State University, 2010, 162 pages.
Meister et al., "Confocal Raman Microspectroscopy as an Analytical Tool to Assess the Mitochondral Status in Human Spermatozoa," Analyst, vol. 135, 2010, pp. 1370-1374.
Miyamoto et al., "Label-free Detection and Classification of DNA by Surface Vibration Spectroscopy in Conjugation with Electrophoresis," Applied Physics Letters, vol. 86, No. 053902, 2005, 3 pages.
Mohlenhoff et al., "Mie-Type Scattering and Non-Beer-Lambert Absorption Behavior of Human Cells in Infared Microspectroscopy," Biophysical Journal, vol. 88, May 2005, pp. 3635-3640.
Montag et al., "Laser-induced Immobilization and Plasma Membrane Permeabilization in Human Spermatozoa," Human Reproduction, vol. 15, No. 4, 2000, pp. 846-852.
Mourant et al., "Methods for Measuring the Infrared Spectra of Biological Cells," Physics in Medicine and Biology, vol. 48, 2003, pp. 243-257.
Van Munster, "Interferometry in Flow to Sort Unstained X-and Y-Chromosome-Bearing Bull Spermatozoa,"Cytometry, vol. 47, 2002, pp. 192-199.
Rajagopalan et al., "Aneuploidy and Cancer," Nature, vol. 432, Nov. 2004, pp. 338-341.
Ropcke et al., "Application of Mid-Infrared Tuneable Diode Laser Absorption Spectroscopy to Plasma Diagnostics: A Review," Plasma Sources Science and Technology, vol. 15, 2006, S148-S168.

Schaden et al., "Quantum Cascade Laser Modulation for Correction of Matrix-Induced Background Changes in Aqueous Samples," Applied Physics B, vol. 86, 2007, pp. 347-351.
Sandt et al., "Identification of Spectral Modifications Occurring during Reprogramming of Somatic Cells," Plos One, vol. 7, Issue 4, e30743, Apr. 2012, 7 pages.
Sell, "Cellular Origin of Cancer: Dedifferentiation or Stem Cell Maturation Arrest?", Environmental Health Perspectives, vol. 101, Suppl. 5, 1993, p. 15-26.
Shapiro et al., "Pratical Flow Cytometry," Fourth Edition, New Jersey: John W. Wiley & Sons, 2003, 733 pages.
Sharpe et al., "Advances in Flow Cytometry for Sperm Sexing," Theriogenology, vol. 71, 2009, pp. 4-10.
Short, "Raman Spectroscopy Detects Biochemical Changes Due to Proliferation in Mammalian Cell Cultures," Biophysical Journal, vol. 88, Jun. 2005, pp. 427 4-4288.
USPTO, "Non-Final Office Action," issued in connection with U.S. Appl. No. 15/226,899, mailed Apr. 12, 2018, 14 pages.
USPTO, "Notice of Allowance," issued in connection with U.S. Appl. No. 15/226,899, mailed Aug. 23, 2018, 5 pages.
USPTO, "Notice of Allowance," issued in connection with U.S. Appl. No. 15/226,899, mailed Sep. 20, 2018, 6 pages.
USPTO, "Final Office Action," issued in connection with U.S. Appl. No. 15/174,681, mailed Jan. 2, 2018, 15 pages.
USPTO, "Final Office Action," issued in connection with U.S. Appl. No. 15/174,681, mailed Sep. 14, 2018, 17 pages.
USPTO, "Non-Final Office Action," issued in connection with U.S. Appl. No. 15/174,681, mailed May 4, 2017, 13 pages.
USPTO, "Non-Final Office Action," issued in connection with U.S. Appl. No. 15/174,681, mailed Apr. 5, 2018, 16 pages.
USPTO, "Notice of Allowance," issued in connection with U.S. Appl. No. 15/174,681, mailed Nov. 27, 2018, 10 pages.
USPTO, "Final Office Action," issued in connection with U.S. Appl. No. 13/298,148, mailed Oct. 18, 2013, 46 pages.
USPTO, "Non-Final Office Action," issued in connection with U.S. Appl. No. 13/298,148, mailed Feb. 5, 2013, 66 pages.
USPTO, "Notice of Allowance," issued in connection with U.S. Appl. No. 13/298,148, mailed Sep. 19, 2014, 9 pages.
USPTO, "Office Action," issued in connection with U.S. Appl. No. 13/298,148, mailed Sep. 28, 2012, 5 pages.
USPTO, "Final Office Action," issued in connection with U.S. Appl. No. 13/894,831, mailed Sep. 10, 2015, 11 pages.
USPTO, "Final Office Action," issued in connection with U.S. Appl. No. 13/894,831, mailed Jun. 15, 2017, 19 pages.
USPTO, "Non-Final Office Action," issued in connection with U.S. Appl. No. 13/894,831, mailed Dec. 23, 2014, 11 pages.
USPTO, "Non-Final Office Action," issued in connection with U.S. Appl. No. 13/894,831, mailed Oct. 5, 2016, 17 pages.
USPTO, "Notice of Allowance," issued in connection with U.S. Appl. No. 13/894,831, mailed Apr. 1, 2016, 8 pages.
USPTO, "Notice of Allowance," issued in connection with U.S. Appl. No. 13/894,831, mailed Sep. 5, 2017, 9 pages.
Wang et al., Detection of endogenous biomolecules in Barrett's esophagus by Fourier transform infrared spectroscopy, PNAS, vol. 104, No. 40, Oct. 2, 2007, p. 15864-15869.
Webster, Merriam, "Definition of "successive," Merriam Webster's Online Dictionary, accessed at http://www.merriamwebster.com/dictionary/successive," Jun. 18, 2013, 1 page.
Weida et al., "Quantum Cascade Laser Based Replacement for FTIR Microscopy," http://www.daylightsolutions. ::pm/assets/003/5308.pdf, accessed online Aug. 2, 2012, 7 pages.
International Bureau, "International Preliminary Report on Patentability," issued in connection with International Patent Application No. PCT/IB2017/001289, mailed Mar. 21, 2019, 12 pages.
International Search Report and Written Opinion for Application Serial No. PCT/IP2017/001289, dated Apr. 3, 2018, 21 pages.
Mehrnoush Malek et al: flowDensity: reproducing manual gating of flow cytometry data by automated density-based cell population identification11 , Bioinformatics., vol. 31, No. 4, Oct. 16, 2014 (Oct. 16, 2014), pp. 606-607.
International Search Report and Written Opinion for Application Serial No. PCT/IB2018/001641, dated Jun. 25, 2020 4 pages.

(56) References Cited

OTHER PUBLICATIONS

China Patent Office, "The Fourth Office Action," issued in connection with China Patent Application No. 201480071952.0, mailed Jan. 3, 2021, 25 pages.
Japan Patent Office, "Notice of Reasons for Refusal," issued in connection with Japan Patent Application No. 2019-088655, mailed Oct. 13, 2020, 5 pages.
Johnson LA et al., Flow sorting of X and Y chromosome-bearing spermatozoa into two populations, Gamete Research. Jan. 1987. 16(1):1-9. (Johnson 1987).
Paape et al., Flow Cytometry: a Versatile Tool for Studies on Cells From Domestic Animals, National Cytometry Symposium, Abstract Only, Dec. 14, 1997, https://www.ars.usda.gov/research/publications/publication/?seqNo115=86408.
Keij, J.F et al., "High-Speed Photodamage Cell Selection Using a Frequency-Doubled Argon Ion Laser." Cytometry 19 (1995): 209-216. (Keij 1995).
Keij, J.F., "Introduction to High-Speed Flow Sorting." Flow and Image Cytometry. Series H: Cell Biology, 95 (1996): 213-227. (Keij 1996).
Johnson LA, Welch GR, Rens W. "The Beltsville sperm sexing technology: high-speed sperm sorting gives improved sperm output for in vitro fertilization and AI." J Anim Sci 1999. 77:213-220.
ABS Global, Inc. And Genus PLC's Renewed Motion For Judgment As A Matter Of Law That The Asserted Claims Of The '987 Patent Are Invalid For Lack Of Enablement And, In The Alternative, For A New Trial. *ABS Global, Inc.* v. *Inguran, LLC & XY, LLC* v. *Genus PLC*. Case: 3:14-cv-00503-wmc. Filed on Jul. 3, 2020.
Brief in Support of ABS Global, Inc. And Genus PLC's Motion for Judgment as A Matter of Law That the Asserted Claims Of The '987 Patent Are Not Enabled. *Inguran, LLC d/b/a Stgenetics, XY, LLC, and Cytonome/ST, LLC*, Plaintiffs/Counterclaim-Defendants, v.*ABS Global, Inc., Genus PLC, and Premium Genetics (UK) LTD*, Defendants/Counterclaim-Plaintiffs. Case: 3:17-cv-00446-wmc. Filed Sep. 6, 2019.
ABS Global, Inc. And Genus PLC Renewed Motion for Judgment As A Matter Of Law That The Asserted Claims Of The 987 Patent Are Invalid For Lack Of Enablement And, In The Alternative, For A New Trial. *nguran, LLC d/b/a Stgenetics, XY, LLC, and Cytonome/ST, LLC*, Plaintiffs/Counterclaim-Defendants, v.*ABS Global, Inc., Benus PLC, and Premium Genetics (UK) LTD*, Defendants/Counterclaim-Plaintiffs. Case: 3:17-cv-00446-wmc. filed Jul. 3, 2020.
ABS Global, Inc. And Genus PLC's Reply In Support Of Their Renewed Motion For Judgment As A Matter Of Law That The Asserted Claims Of The '987 Patent Are Invalid For Lack Of Enablement And, In The Alternative, For A New Trial. *Inguran, LLC d/b/a Stgenetics, XY, LLC, and Cytonome/ST, LLC*, Plaintiffs/Counterclaim-Defendants, v. *ABS Global, Inc., Genus PLC, and Premium Genetics (UK) LTD*, Defendants/Counterclaim-Plaintiffs. Case: :17-cv-00446-wmc. Filed Aug. 17, 2020.
ABS Global, Inc. and Genus PLC's Motion For Judgment As A Matter Of Law That The Asserted Claims Of The 987 And '092 Patents Are Invalid. *ABS Global, Inc.*, Plaintiff/Counterclaim Defendant, v. *Inguran, LLC d/b/a Sexing Technologies*, Defendant/Counterclaim Plaintiff, and *XY, LLC*, Intervenor-Defendant/Counterclaim Plaintiff, v. *Genus PLC*, Counterclaim Defendant. Case: 3:14-cv-00503-wmc. Filed Aug. 9, 2016.
ABS Global, Inc. and Genus PLC's Rule 50(8) Motion For Judgment As A Matter Of Law And Rule 59 Motion For A New Trial. *ABS Global, Inc.*, Plaintiff/Counterclaim Defendant, v. *Inguran, LLC d/b/a Sexing Technologies*, Defendant/Counterclaim Plaintiff, and *XY, LLC*, Intervenor-Defendant/Counterclaim Plaintiff, v. *Benus PLC*, Counterclaim Defendant. Case: 3:14-cv-00503-wmc. Filed Sep. 2, 2016.
Opinion and Order of the United States District Court For *The Western District Of Wisconsin*. Plaintiff/Counterclaim Defendant, v. *Inguran, LLC d/b/a Sexing Technologies*, Defendant/Counterclaim Plaintiff, and *XY, LLC*, Intervenor-Defendant/Counterclaim Plaintiff, v. *Genus PLC*, Counterclaim Defendant. Case: 3:14-cv-00503-wmc. riled Mar. 31, 2017.
Appeal from the United States District Court for the Western District of Wisconsin. No. 14-CV-503. *ABS Global, NC.*, Plaintiff/Counterclaim Defendant-Appellant, and *Genus PLC*, Counterclaim Defendant-Appellant, v. *Inguran, LLC*, doing business as Sexing Technologies, Defendant/Counterclaim Plaintiff-Appellee, and *XY, LLC*, Intervening Defendant/Counterclaim Plaintiff-Appellee. Case: 3:14-cv-00503-wmc. Filed: Mar. 8, 2019.
Judge's Opinion & Order in Case No. 14-cv-503-wmc. Plaintiff/Counterclaim Defendant, v. *Inguran, LLC di b/a Sexing Technologies*, Defendant/Counterclaim Plaintiff, and *XY, LLC*, Intervenor-Defendant/Counterclaim Plaintiff, v. *Genus PLC*, Counterclaim Defendant. Case: 3:14-cv-00503-wmc. Filed Jul. 21, 2016.
ABS Global Inc. and Genus PLC's Reply in Support of Their Motion for Claim Construction and Partial Summary Judgment, *ABS Global, Inc.* v. *Inguran, LLC d/b/a Sexing Technologies*, Case No. 14-cv-503, United States District Court for the Western District of Wisconsin. Mar. 7, 2016.
USPTO, "Non-Final Office Action," issued in connection with U.S. Appl. No. 16/741,608, dated Mar. 18, 2022, 12 pages.
USPTO, "Notice of Allowance," issued in connection with U.S. Appl. No. 17/412,789, mailed Mar. 21, 2022, 30 pages.
USPTO, "Notice of Allowance," issued in connection with U.S. Appl. No. 17/458,947, mailed Mar. 31, 2022, 30 pages.
USPTO, "Final Office Action," issued in connection with U.S. Appl. No. 16/741,608, dated Jun. 13, 2022, 11 pages.
USPTO, "Non-Final Office Action," issued in connection with U.S. Appl. No. 17/403,642, dated Jul. 13, 2022, 7 pages.
CNIPA, "First Office Action," issued in connection with Chinese Patent Application No. 202080028183.1, mailed Jul. 6, 2022, 21 pages.
USPTO, "Notice of Allowance," issued in connection with U.S. Appl. No. 16/852,303, mailed Sep. 20, 2023, 31 pages.
European Patent Office, "Communication pursuant to Article 94(3) EPC," issued in connection with European Patent Application No. 17808998.3, mailed Sep. 15, 2023, 4 pages.
European Patent Office, "European Search Report," issued in connection with patent application No. 20913158.0, mailed Sep. 20, 9 pages.
European Patent Office, "European Search Report," issued in connection with patent application No. 23169267.4 mailed Jul. 14, 2023, 5 pages.
Brazilian Office Action, Application No. BR112021012000-9, mailed Aug. 16, 2023, 4 pages.
China National Intellectual Property Administration, "Second Office Action, " issued in connection with Chinese Patent Application No. 202080028183.1, mailed Jan. 13, 2023, 23 pages.
Notice of Allowance issued in U.S. Appl. No. 17/851,319 on Feb. 15, 2023, 52 pages.
Kang, et al. "Effect of an osmotic differential on the efficiency of gene transfer by electroporation of fish spermatozoa." Aquaculture 173.1-4 (1999): 297-307. (Year: 1999).
Rieth et al. "Electroporation of bovine spermatozoa to carry DNA containing highly repetitive sequences into oocytes and detection of homologous recombination events." Molecular Reproduction and Development: Incorporating Gamete Research 57.4 (2000): 338-345.
Chamberland et al. "The effect of heparin on motility parameters and protein phosphorylation during bovine sperm capacitation." Theriogenology 55.3 (2001): 823-835. (Year: 2001).
Chan, et al. "Luminescent quantum dots for multiplexed biological detection and imaging." Current opinion in biotechnology 13.1 (2002): 40-46. (Year: 2002).
USPTO, "Non-Final Office Action," issued in connection with U.S. Appl. No. 16/561,146, dated Jan. 21, 2022, 14 pages.
USPTO, "Non-Final Office Action," issued in connection with U.S. Appl. No. 17/496,469, dated Jan. 28, 2022, 13 pages.
Notice of Allowance issued in U.S. Appl. No. 17/692,876 on Feb. 1, 2023, 24 pages.

(56) References Cited

OTHER PUBLICATIONS

European Patent Office, "European Search Report," issued in connection with European Patent Application No. 22190948.4, mailed Jan. 23, 2023, 10 pages.
European Patent Office, "Intention to Grant Notice," issued in connection with patent application No. 20167363.9, mailed Dec. 15, 2022, 8 pages.
Notice of Allowance issued in U.S. Appl. No. 16/741,608 on Feb. 7, 2023, 22 pages.
Jokinen, Ville, et al. "Durable superhydrophobicity in embossed CYTOP fluoropolymer micro and nanostructures", Colloids and Surfaces A: Physicochemical and Engineering Aspects, vol. 434, 2013, pp. 207-212.
Forsberg, Pontus, Fredrik Nikolajeff, and Mikael Karlsson, "Cassie-Wenzel and Wenzel-Cassie transitions on immersed superhydrophobic surfaces under hydrostatic pressure", Soft Matter, vol. 7, No. 1, 2011, pp. 104-109.
Lu, Hang, Martin A. Schmidt, and Klavs F. Jensen, "Photochemical reactions and on-line UV detection in microfabricated reactors", Lab on a Chip, vol. 1, No. 1, 2001, pp. 22-28.
National Institute of Industrial Property (INPI) Argentina, "Examination Report," issued in connection with Argentina Patent Application No. 20190101378, mailed Apr. 19, 2023, 8 pages.
China National Intellectual Property Administration, "Decision of Rejection," issue in connection with Chinese Patent Application No. 202080028183.1, mailed Jun. 7, 2023, 23 pages.
USPTO, "Non-Final Office Action," issued in connection with U.S. Appl. No. 17/164,710, dated Jun. 26, 2023, 13 pages.
Jokinen, Ville, et al. "Durable superhydrophobicity in embossed CYTOP fluoropolymer micro and hanostructures", Colloids and Surfaces A: Physicochemical and Engineering Aspects, vol. 434, 2013, pp. 207-212.
Japan Patent Office, "Office Action," issued in connection with Japanese Patent Application No. 2019-513891, Jun. 24, 2021, 11 pages.
Brazilian Office Action, Application No. BR112019004727-1, mailed Jul. 6, 2021, 4 pages.
Australian Office Action, Application No. 2017323502, mailed Jun. 28, 2021, 6 pages.
China Office Action, Application No. 201780056064.5, mailed Apr. 26, 2021, 8 pages.
China Office Action, Application No. 201780056064.5, mailed Nov. 4, 2020 11 pages.
Europe Office Action, Application No. 17808998.3, mailed Jul. 21, 2020.
Pedreira Carlos E et al: "Overview of clinical flow cytometry data analysis: recent advances and future challenges", Trends in Biotechnology, Elsevier Publications, Cambridge, GB, vol. 31, No. 7, Jun. 5, 2013.
China Patent Office, "The Third Office Action," issued in connection with China Patent Application No. 201480071952.0, mailed Jul. 23, 2020, 23 pages.
Intellectual Property India, "Examination Report," issued in connection with Indian Patent Application No. 3429/DELNP/2015, mailed Mar. 26, 2018, 6 pages.
European Patent Office, "European Search Report," issued in connection with patent application No. 20167363.9, mailed Jul. 21, 2020, 9 pages.
Japan Patent Office, "Notice of Reasons for Refusal," issued in connection with Japan Patent Application No. 2018-220397, mailed Aug. 5, 2020, 3 pages.
European Patent Office, "Examination Report," issued in connection with European Patent Application No. 16723498.8, mailed Oct. 12, 2020, 6 pages.
European Patent Office, "European Search Report," issued in connection with European Patent Application No. 14168200.5, mailed Mar. 20, 2015, 12 pages.
European Patent Office, "European Search Report," issued in connection with European Patent Application No. 17172322.4, mailed Aug. 24, 2017, 8 pages.

European Patent Office, "European Search Report," issued in connection with European Patent Application No. 15160613.4, mailed Jul. 24, 2015, 14 pages.
European Patent Office, "Communication pursuant to Article 94(3) EPC, " issued in connection with European Patent Application No. 17172322.4, mailed Aug. 14, 2018, 5 pages.
European Patent Office, "Communication pursuant to Article 94(3) EPC," issued in connection with European Patent Application No. 11193936.9, mailed Dec. 11, 2015, 3 pages.
European Patent Office, "Communication pursuant to Article 94(3) EPC," issued in connection with European Patent Application No. 15160613.4, mailed Jul. 11, 2016, 4 pages.
Hori et al., "Cell fusion by optical trapping with laser-involves contacting different cells with each other then imparting high voltage pulse to cells," WPI/Thompson, Dec. 27, 1991, Abstract, 1 page.
Japan Patent Office, "Notification of Reasons for Refusal," issued in connection with Japanese Patent Application No. 2016-185743, mailed Jul. 3, 2018, 7 pages.
Japan Patent Office, "Final Notification of Reasons for Rejection," issued in connection with Japanese Patent Application No. 2011-256171, mailed Oct. 28, 2014, 5 pages.
Japan Patent Office, "Decision for Grant," issued in connection with Japanese Patent Application No. 2015-091320, mailed May 6, 2017, 7 pages.
Japan Patent Office, "Final Notification of Reasons for Rejection," issued in connection with Japanese Patent Application No. 2015-091320, mailed Mar. 22, 2016, 22 pages.
Japan Patent Office, "Notification of Reasons for Refusal," issued in connection with Japanese Patent Application No. 2016-185743, mailed Jul. 26, 2017, 2 pages.
Smith et al., "Inexpensive Optical Tweezers for Undergraduate Laboratories," Am. J. Phys., vol. 67, No. 1, Jan. 1999, 10 pages.
Takayama et al., "Patterning Cells and Their Environments Using Multiple Laminar Fluid Flows in Capillary Networks," Proceedings of National Academy of Sciences, vol. 96, 1999, 4 pages.
Ts'O, Basic Principles in Nucleic Acid Chemistry, National Library of Medicine, 1974, pp. 311-387.
International Preliminary Report on Patentability corresponding to International Patent Application No. PCT/ US2013/050669, mailed Jan. 28, 2016, 15 pages.
Supplementary European Search Report for U.S. Appl. No. 13/889,551, dated May 22, 2017, 12 pages.
State Intellectual Property Office of People's Republic of China, "Second Office Action," issued in connection with Chinese Patent Application No. 201380079634.4, mailed Jun. 4, 2018, 14 pages.
Japan Patent Office, "Notice of Reasons for Rejection," issued in connection with Japanese Patent Application No. 2017-168904, mailed Jul. 6, 2018, 3 pages.
State Intellectual Property Office of People's Republic of China, "Third Office Action," issued in connection with Chinese Patent Application No. 201380079634.4, mailed Nov. 1, 2018, 20 pages.
Japanese Office Action for Application No. 2016-527978 dated Mar. 28, 2017, 8 pages.
State Intellectual Property Office of People's Republic of China, "First Office Action," issued in connection with Chinese Patent Application No. 201380079634.4, mailed Jul. 28, 2017, 18 pages.
Indian Patent Application No. 3425/DELNP/2015 Pre-Grant Opposition, mailed Dec. 4, 2020, 138 pages.
Indian Patent Application No. 3425/DELNP/2015 Pre-Grant Opposition, mailed Jul. 21, 2020, 59 pages.
Indian Patent Application No. 3425/DELNP/2015 Pre-Grant Opposition, mailed Jul. 21, 2020, 96 pages.
Indian Patent Application No. 3425/DELNP/2015 Pre-Grant Opposition, mailed Jul. 2, 2020, 137 pages.
USPTO, "Final Office Action," issued in connection with U.S. Appl. No. 17/403,642, dated Mar. 4, 2022, 14 pages.
Australian Office Action, Application No. 2021200818, dated Mar. 4, 2022, 3 pages.
USPTO, "Final Office Action," issued in connection with U.S. Appl. No. 16/852,303, dated May 27, 2022, 48 pages.
USPTO, "Non-Final Office Action," issued in connection with U.S. Appl. No. 16/279,430, dated May 23, 2022, 14 pages.

(56) References Cited

OTHER PUBLICATIONS

European Patent Office, "Examination Report," issued in connection with patent application No. 20167363.9, mailed Mar. 22, 2022, 4 pages.
European Patent Office, "Examination Report," issued in connection with patent application No. 19182993.6, mailed May 10, 2022, 8 pages.
International Search Report and Written Opinion for Application Serial No. PCT/US2021/059148, dated May 4, 2022, 15 pages.
European Patent Office, "Communication under Rule 71(3) EPC," issued in connection with European Patent Application No. 16723498.8, mailed May 18, 2022, 54 pages.
IP Australia, "Notice of Acceptance for Patent Application," issued in connection with Australian Patent Application No. 2021200818, mailed Jun. 1, 2022, 3 pages.
Fievet et al., ART-Deco: easy tool for detection and characterization of cross-contamination of DNA samples in diagnostic next-generation sequencing analysis, European Journal of Human Genetics, vol. 27, No. 5, Jan. 25, 2019, pp. 792-800.
European Patent Office, "Extended European Search Report," issued in connection with patent application 21883920.7 dated Sep. 9, 2024.
European Patent Office, "Extended European Search Report," issued in connection with patent application 21895392.5 dated Sep. 4, 2024.
China Patent Office, "The Fifth Office Action," issued in connection with China Patent Application No. 2014800719520, Oct. 20, 2021, 7 pages.
USPTO, "Non-Final Office Action," issued in connection with U.S. Appl. No. 17/458,947, dated Dec. 15, 2021, 9 pages.
USPTO, "Notice of Allowance," issued in connection with U.S. Appl. No. 16/864,514, mailed Jan. 3, 2022, 24 pages.
USPTO, "Notice of Allowance," issued in connection with U.S. Appl. No. 16/419,756, mailed Jan. 12, 2022, 16 pages.
USPTO, "Non-Final Office Action," issued in connection with U.S. Appl. No. 16/852,303, dated Jan. 6, 2022, 27 pages.
Intellectual Property India, "Examination Report," issued in connection with Indian Patent Application No. 202147003036, mailed Jan. 4, 2022, 5 pages.
Di Carlo, "Inertial microfluidics." Lab on a Chip 9.21 (2009): 3038-3046.
Intellectual Property India, "Examination Report," issued in connection with Indian Patent Application No. 202017054203, mailed Jan. 7, 2022, 5 pages.
State Intellectual Property Office of People's Republic of China, "First Office Action," issued in connection with Chinese Patent Application No. 2018801002551, Jan. 26, 2024, 8 pages.
USPTO, "Non-Final Office Action," issued in connection with U.S. Appl. No. 17/525,125, mailed Mar. 7, 2024, 15 pages.
Thermofisher, Optics of a Flow Cytometer, Sep. 2020, ThermoFisher, https://www.thermofisher.com/us/en/home/life-science/cell-analysis/cell-analysis-learning-center/molecular-probes-school-of-fluorescence/flow-cytometry-basics/flow-cytometry-fundamentals/optics-flow-cytometer.html (Year: 2020), 76 pages.
De Novo, Flow Cytometery: a basic introduction, Sep. 2019, De Novo, Chapter 2: The Flow cytometer, https://flowbook.denovosoftware.com/chapter-2-flow-cytometer (Year: 2019), 10 pages.
Brazilian Office Action, Application No. BR112019004727-1, mailed Mar. 20, 2023, 6 pages.
USPTO "Final Office Action," issued in connection with U.S. Appl. No. 16/852,303, mailed May 1, 2023, 33 pages.
USPTO, "Non-Final Office Action," issued in connection with U.S. Appl. No. 17/692,876, dated Sep. 19, 2022, 21 pages.
USPTO, "Notice of Allowance," issued in connection with U.S. Appl. No. 17/403,642, mailed Sep. 29, 2022, 24 pages.
USPTO, "Final Office Action," issued in connection with U.S. Appl. No. 16/741,608, dated Oct. 19, 2022, 12 pages.
USPTO, "Non-Final Office Action," issued in connection with U.S. Appl. No. 17/851,319, dated Nov. 2, 2022, 12 pages.
USPTO, "Final Office Action," issued in connection with U.S. Appl. No. 16/279,430, dated Dec. 6, 2022, 18 pages.
USPTO "Final Office Action," issued in connection with U.S. Appl. No. 17/507,662, mailed Jan. 6, 2025, 21 pages.
USPTO, "Notice of Allowance," issued in connection with U.S. Appl. No. 29/867,647, mailed Jan. 29, 2025, 16 pages.
European Patent Office, "European Search Report," issued in connection with patent application No. 21895392.5, mailed Nov. 26, 2024, 10 pages.
China National Intellectual Property Administration, "Second Office Action," issued in connection with Chinese Patent Application No. 202080091173.2, mailed Jan. 8, 2025, 25 pages.

* cited by examiner

SYSTEM AND METHODS FOR SUB-POPULATION IDENTIFICATION WITHIN A MIXTURE OF PARTICLES BASED ON CRITICAL RANGES OF VALUES

CROSS-REFERENCES TO RELATED APPLICATIONS

This application is a 371 application and claims benefit of PCT Patent Application No. PCT/IB2018/001641, filed Dec. 21, 2018, the specification(s) of which is/are incorporated herein in their entirety by reference.

BACKGROUND

Generally, this application relates to flow cytometry. In particular, this application relates to systems and techniques for determining whether a particular cytometric event is included within a subset or a gate or is excluded from a subset or from a gate.

Flow cytometry may utilize light detection to assess characteristics of particles, such as cells, flowing through the cytometer. In certain applications, a cytometer may detect light emitted by cells, including light emitted by fluorescent, DNA-intercalating dye. The ability to assess and classify particles is a fundamental operation of cytometers.

Cytometers measure characteristics of particles and provide information on the measured characteristics. Typically, this information is represented graphically in the form of a histogram or a scatter plot, although this information is usually also collected and stored in a computer-readable form. The information relating to these measurements can be used to identify subpopulations within the starting set of particles, or to define subjective or objective values for the measured characteristics. This is often accomplished by defining a gate using the graphical representation. Generally, the procedure for drawing a gate around a population is done manually: an operator makes a visual inspection of the graphical representation of the mixture of particles as it is analyzed, and manually sets the points used to differentiate populations or subsets of the mixture from one another. Once subsets have been defined by the drawing of gates, all subsequent events can be defined as falling within a gate (i.e. as belonging to the defined subset) or as falling outside a gate (i.e. not belonging to the defined subset, and/or belonging to a different subset). This has significance to a number of applications, including quantitative flow cytometric assays, and cellular discrimination such as fluorescence-activated cell sorting (FACS).

One such application is the determination of whether a sperm cell has an X-chromosome (which will produce a female zygote) or alternatively an Y-chromosome (which will produce a male zygote). A sperm cell with two X-chromosomes may have approximately 3% more DNA than a sperm cell with an X-chromosome and a Y-chromosome. By identifying the chromosomal content of a sperm cell, it may be possible to create a relatively high-purity population of X-chromosome or Y-chromosome bearing sperm cells. Such a population may be generated, for example, by keeping the desired gender and killing the undesired one (or by segregating the two genders). The substantially high-purity population may be used to inseminate a female animal (such as bovids, equids, ovids, goats, swine, dogs, cats, camels, elephants, oxen, buffalo, or the like) to obtain a desired male or female offspring, with relatively high probability.

The characteristics of the chromosomes may be identified by staining the DNA of sperm cells with a fluorochrome (for example, a DNA-intercalating dye). The stained sperm cells may be forced to flow in a narrow stream or band and pass by an excitation or irradiation source such as a laser beam. As the stained sperm cells (a plurality of particles) are irradiated, the fluorochrome in the plurality of particles emits a responsive fluorescent light. The amount of fluorescent light may vary based at least in part on a relative amount of at least one particle differentiation characteristic (for example, the relative amount of DNA indicative of the presence of an X or Y chromosome) present in each of the plurality of particles. The fluorescent light may be received by one or more optical elements that ultimately focus the received light onto a detection component, such as a photomultiplier tube ("PMT") or an avalanche photodiode (APD). The detection component may generate an electrical, analog signal in response to the received light. The analog signal may vary in correspondence with the amount of received light. This signal may then be processed (for example, digitized and analyzed by a processor) to assess the chromosomal content of the sperm cell, which can be represented graphically as a histogram (e.g. data as a vector of peak voltage values, with the index adjustment being a function of bin width) or a scatterplot (e.g. data as a mapping of peak voltage values and area voltage values into a vector that is used to display the most current data as a spectrogram). These graphical representations can then provide the basis for defining subpopulations and/or drawing gates. This is typically done by a user, using her best judgment to pick points establishing the boundary of a gate or a threshold.

Currently available systems for setting gates or thresholds for defining subpopulations suffer from several significant deficiencies. First, the selection of the definition criteria (i.e. the values at which the gate or threshold points are set) is performed by individual operators. This is fundamentally subjective and variable among operators, and even between samples run by the same operator, or between runs of the same sample by the same operator. This ultimately leads to variability in the operation of the flow cytometric systems. In the case of sex sorting cytometers, this can result in significant differences in the yield (i.e. the number of live cells collected) or purity (i.e. the proportion of collected cells having an X- or Y-chromosome) of the sex sperm cell product.

In addition, current approaches to sub-population definition and discrimination result in operation where the bases for discrimination are essentially static—the gates or thresholds remain unchanged during operation. In practice, this means that an operator must monitor the subpopulations over the course of the run, and/or the relationship of the gates or thresholds to a subpopulation may change during the course of operation, due to a number of factors such as changes in temperature or pressure, or loss of signal.

The systems and techniques described herein overcome these and other shortcomings and provide significant benefits, as will be appreciated by those skilled in the art.

SUMMARY

According to certain inventive implementations, the present invention provides a system for identification of sub-populations within a mixture of particles. According to certain implementations, the system includes a sample delivery apparatus, a cytometer, a control apparatus, and a sorting apparatus. The control is configured to implement a self-calibrating identification or discrimination technique. The self-calibrating identification or discrimination technique utilizes the information obtained for particles in the mixture to define subpopulations within the mixture. The system then assigns a subpopulation classification to particles in the mixture based on this definition. The definition of subpopulations is continuously refined though the integration of additional information obtained for additional particles in the mixture. The control is further configured to receive event data from the cytometer in the form of values corresponding to detected particles in a sample, distinguish the values of measured characteristics for each sub-population in the sample, assign a critical range of values to each of the sub-populations based on the distinguishing, updating the critical range of values based on the distinguishing of the values of the measured characteristics for sub-populations in a second set of particles, and assign a sub-population classification to particles in the mixture based on the updated critical range of values.

According to certain inventive implementations, the control may further be configured to identify at least one critical value for a first characteristic from the distribution; obtaining the values for a second characteristic associated with the critical value for the first characteristic; produce a distribution of the values for the second characteristic; identify at least one critical value for the second characteristic from the distribution of values for the second characteristic; co-locate the critical values for the first and second characteristics in a feature space; and determining the at least one discrimination values from the critical values co-located in the feature space.

According to certain inventive techniques, a method includes: identifying subpopulations within a mixture of particles, comprising: measuring a characteristic of a first set of particles in a mixture of particles having two or more sub-populations, each sub-population being distinguishable by the characteristic; distinguishing the values of the measured characteristics for each of the sub-populations in the mixture; assigning a critical range of values to each of the sub-populations based on the distinguishing; subsequent to the assigning a critical range of values, measuring the characteristics of a second set of particles in the mixture of particles; subsequent to measuring the characteristics of a second set of particles in the mixture of particles, distinguishing the values of the measured characteristics for each of the sub-populations in the second set of particles; updating the critical range of values based on the distinguishing of the values of the measured characteristics for each of the sub-populations in the second set of particles; and assigning a sub-population classification to particles in the mixture based on the updated critical range of values.

According to certain inventive techniques, the methods further comprise sorting said particles according to the classification assigned to the particles based on the updated critical range of values. According to certain inventive techniques, the methods further comprising destroying or incapacitating the sub-population assigned the classification. According to certain inventive techniques, the particles are sperm cells. According to certain inventive techniques, the sperm cells are bovine sperm cells. According to certain inventive techniques, the characteristic of the sperm cells is the presence of an X-chromosome or a Y chromosome. According to certain inventive techniques, the sperm cells have been stained with a fluorescent DNA-binding dye.

According to certain inventive techniques, a method includes identifying multiple sets of particles within a mixture of sets of particles, each sub-population having a characteristic different from other sub-populations, comprising: providing the mixture of particles; detecting a characteristic of a first set of multiple particles within the mixture to produce a signal indicative of the characteristic for the first set of particles; generating event data for the signal indicative of the characteristic for said first set of particles; compiling the event data for the first set of particles; generating a distribution of event data for the first set of particles; calculating at least one discrimination value that defines a sub-population of particles based on the distribution of event data for the first set of particles; classifying particles based on the discrimination value that defines the subpopulation. According to certain inventive techniques, the method further comprises instructing a sorting apparatus to include or exclude events based on the classification. According to certain inventive techniques, the method further comprises destroying or incapacitating the sub-population assigned the classification. According to certain inventive techniques, the particles are sperm cells. According to certain inventive techniques, the sperm cells are bovine sperm cells. According to certain inventive techniques, the characteristic of said sperm cells is the presence of an X-chromosome or a Y-chromosome. According to certain inventive techniques, the sperm cells are labeled with a fluorescent DNA-binding dye.

According to certain inventive techniques, calculating at least one discrimination value comprises defining at least on critical value related to a detected characteristic. According to certain inventive techniques, calculating at least one discrimination value further comprises: identifying at least one critical value for a first characteristic from the distribution of event data for the first set of particles; obtaining the values for a second characteristic associated with the critical value for the first characteristic; producing a distribution of the values for the second characteristic; identifying at least one critical value for the second characteristic from the distribution of values for the second characteristic; co-locating the critical values for the first and second characteristics in a feature space; and determining the at least one discrimination values from the critical values co-located in the feature space. According to certain inventive techniques, calculation of at least one discrimination value further comprises adjusting the critical values to include event data from a second set of particles. According to certain inventive techniques, the critical values comprise one or more peak characteristic values for a first sub-population, and one or more peak characteristic values for a second subpopulation. According to certain inventive techniques, the peak characteristic values comprise peak fluorescence intensity and peak total fluorescence. According to certain inventive techniques, the critical values further comprise a trough value between the peak characteristic values for the first and second subpopulations. According to certain inventive techniques, the discrimination value comprises a gate.

According to certain inventive techniques, a sexed sperm cell sample is produced by any one of the methods of any of the preceding claims.

The foregoing summary, as well as the following detailed description of certain techniques and systems of the present application, will be better understood when read in conjunction with the appended drawings. For the purposes of illustration, certain systems and techniques are shown in the drawings. It should be understood, however, that the claims are not limited to the arrangements and instrumentality shown in the attached drawings.

DETAILED DESCRIPTION

Certain inventive systems and techniques discussed herein relate to a cytometer that includes a mechanism to use known relationships in frequency or quantum of characteristics of particles in a mixture to identify, define, or distinguish subpopulations within the mixture. The advantageous systems and techniques allow for optimization of throughput (yield and/or purity), reduction in variability and increase in operational consistency, and reduction in human user input and variability associated therewith. These advantageous systems and techniques provide decisions that reliably discriminate between particles having different characteristics, thereby providing differential classification.

The systems and methods of the present invention may be used for discrimination of one or more subpopulations of particles in a mixture. This can be accomplished by detecting or assessing a single characteristic, or multiple characteristics of the particles. Characteristics can be assessed using different means of identification, including, for example, fluorescent markers (e.g. fluorescent dyes or fluorescent markers coupled to one or more target-specific molecules, such as antibodies or antibody fragments or other molecular markers). In a further aspect, the methods and systems of the present invention involve sorting cells, such as sperm, by distinguishing differences in DNA content. The cells are stained with a DNA specific dye by mixing the sperm with the dye and then electroporating them. The sperm can be maintained at temperatures that enhance sperm viability, typically equal to or less than 39° C. The sperm are then passed before an excitation light source causing the stained DNA to fluoresce, and then passed through means for detecting the fluorescence and a means for cell sorting, wherein the cells are sorted by DNA content, and the sorted sperm collected. The methods and apparatus are appropriate for mammalian sperm sorting, such as those from bovine, swine, rabbit, alpaca, horse, dog, cat, ferret, rat, mouse and buffalo. Both membrane permeant and impermeant dyes can be used. Useful dyes include those from the SYTOX blue, orange and green series, cyanine dimers and monomers, POPO-1, BOBO-1, YOYO-1, TOTO-1, JOJO-1, POPO-3, LOLO-1, BOBO-3, YOYO-3, TOTO-3, PO-PRO-1, BO-PRO-1, YO-PRO-1, TO-PRO-1, JO-PRO-1, PO-PRO-3, LO-PRO-1, BO-PRO-3, YO-PRO-3, TO-PRO-3, TO-PRO-5, acridine homodimer, 7-amino actinomycin D, ethidium bromide, ethidium homodimer-1, ethidium homodimer-2, ethidium nonazide, nuclear yellow, propidium iodide. Other useful dyes include those from SYTO 40 blue, green, orange and red fluorescent dyes, Hoechst dyes and dihydroethidium. To enhance the signal, nanoparticles, such as quantum dots and metallic nanoparticles, can be introduced. The particles can be tagged with targeting molecules. Sorting efficiency can be greater than 90%, while sperm viability rates are greater than 30%, typically greater than 90%. Alternatively, instead of electroporating the cells, the dye is introduced into the cells by osmotic gradients. Cells are first incubated in hypertonic conditions, and then transferred to hypotonic conditions; the DNA-staining dye can be added to either, or both, hypertonic and hypotonic solutions. After dying the cells, they are ready to be sorted or further processed. In other aspects, the systems and methods of the invention may involve detecting differences in DNA content without the use of DNA stains, for example by U.S. Pat. Nos. 8,502,148, 9,835,552; and 9,683,922. In another aspect, the systems and methods of the invention may involve detecting characteristics of particles using other means of analysis, including for example side-scatter, forward scatter, or back-scatter of light, or a live/dead stain (such as propidium iodide or other viability stains).

In another aspect, the systems and methods of the present invention may involve establishing or modifying a threshold or gate. A threshold generally refers to a value, typically related to a particular characteristic, that can be used to classify individual events. For example, an intensity threshold can be set at a value that will permit discrimination of fluorescence as indicative of live cells (e.g. above the threshold value) or dead cells (below the threshold value). Similarly, a gate refers to a set of points or vertices that bound a region in a two-dimensional graphical representation of detected characteristics. For example, a gate may refer to a set of four or more points that are connected to form a polygon around a subpopulation. A gate can be used to define or discriminate a particular subpopulation. The individual points or vertices that make up a gate can be discrimination values, calculated from event data. On a scatter plot, each point or vertex of a gate has an X and a Y coordinate. The value of these coordinates can be determined by calculation based on complied event data, and/or by values contained in the parameter set. The gate can then be used to classify individual events as to whether they fall inside or outside of the gate. For example, the gate may be established to be inclusive of a particular cell type, based on the presence of fluorescent markers bound to two cell surface markers; cells that have both markers will fall within the gate, while any cells lacking one or both markers will fall outside the gate.

Sorting System

In one aspect, a system for optimized particle discrimination and sorting is provided. In one aspect, the system includes a sample delivery apparatus. A mixture of particles is delivered to the cytometric system by a sample delivery system. As will be appreciated by a person of skill in the art, sample delivery may be accomplished using pumps, including syringe pumps, peristaltic pumps, and or an increase of pressure differential between the sample and the system. Generally, sample delivery systems are capable of either discretely or continuous sampling a mixture of particles in liquid suspension, and moving the mixture of particles to the cytometric apparatus. In some applications, the sample delivery system may also involve mixing the mixture of particles with another fluid, and/or delivery of a buffer or sheath fluid. The sperm sample to be sorted may be a freshly collected sample from a source animal, such as bovine, equine, porcine, or other mammalian source, or a thawed, previously cryopreserved sample. Moreover, the sample may be a single ejaculate, multiple pooled ejaculates from the same mammal, or multiple pooled ejaculates from two or more animals.

Various collection methods are known and include the gloved-hand method, use of an artificial vagina, and electro-ejaculation. The sperm are preferably collected or quickly transferred into an insulated container to avoid a rapid temperature change from physiological temperatures (typically about 35° C. to about 39° C.). The ejaculate typically contains about 0.5 to 15 billion sperm per milliliter, depending upon the species and particular animal.

Regardless of the method of collection, an aliquot may be drawn from the sperm sample and evaluated for various characteristics, such as for example, sperm concentration, sperm motility, sperm progressive motility, sample pH, sperm membrane integrity, and sperm morphology. This data may be obtained by examination of the sperm using, for example, the Hamilton-Thorn Motility Analyzer (IVOS), according to standard and well known procedures (see, for example, Farrell et al. Theriogenology (1998) 49 (4): 871-9; and U.S. Pat. Nos. 4,896,966 and 4,896,967).

In another aspect, the systems of the present invention include a cytometry apparatus. The cytometry apparatus detects characteristics of particles as events, and provides signals corresponding to events to a processor. According to certain aspects, a flow cytometry apparatus includes: a flow chamber configured to direct a fluid stream including sample particles through a particle interrogation location; a laser configured to emit electromagnetic radiation along a beam path to the particle interrogation location; a detector configured to receive electromagnetic radiation from the interrogation location; and output a time-varying analog signal indicative of an intensity of the received electromagnetic radiation; at least one amplifier configured to amplify the time-varying analog signal; an analog-to-digital converter configured to receive the amplified time-varying analog signal and produce a corresponding digitized output signal. In further aspects, the detector may be a photomultiplier tube (PMT) or an avalanche photodiode (APD). The cytometer may further include a temperature sensor configured to sense a temperature and generate a corresponding temperature signal encoding temperature data, wherein the voltage adjustment circuitry is further configured to adjust the voltage on the feedback loop based at least in part on the temperature data and the voltage measured between the filter and the avalanche photodiode. The voltage adjustment circuitry may further be configured to adjust the voltage on the feedback loop based at least in part on at least one characteristic of the avalanche photodiode, the temperature data, and the voltage measured between the filter and the avalanche photodiode. The voltage adjustment circuitry may further be configured to adjust the voltage on the feedback loop based at least in part on at least one characteristic of the avalanche photodiode and the voltage measured between the filter and the avalanche photodiode. The voltage adjustment circuitry may include: an analog-to-digital converter configured to convert the voltage measured between the filter and the avalanche photodiode into a digital measured signal encoding measured voltage data; a processor configured to process at least the measured voltage data to generate a digital adjustment signal; and a digital-to-analog converter configured to convert the digital adjustment signal to an adjustment voltage, wherein the adjustment voltage influences the voltage on the feedback loop. The processor may be configured to process at least temperature data and the measured voltage data to generate the digital adjustment signal. The processor may be configured to process at least temperature data, data corresponding to at least one characteristic of the avalanche photodiode, and the measured voltage data to generate the digital adjustment signal. The at least one characteristic of the avalanche photodiode may include at least one of a breakdown voltage and a reverse bias voltage corresponding to a predetermined optical gain. The cytometer may further include: a first amplifier configured to amplify a voltage at an anode of the avalanche photodiode to form a first amplified voltage; and a second amplifier configured to amplify the first amplified voltage to generate a second amplified voltage. The power supply may include a DC/DC power supply. The avalanche photodiode may be: arranged to receive an amount of fluorescent light emitted by each of a plurality of particles; the amount of received fluorescent light may vary based at least in part upon a relative amount of at least one particle differentiation characteristic present in each of the plurality of particles; and the avalanche photodiode may be configured to convert the amount of received fluorescent light into at least one signal which varies based upon the amount of received fluorescent light.

A stream of particles may pass through a flow chamber, such that they may be single-file in certain strategic locations. The flow chamber may direct a fluid stream including the mixture of particles through a particle interrogation location. The mixture of particles may have been previously stained with a dye, such as a DNA-intercalating dye. Such a dye may fluoresce (or cause fluorescence) as it generates responsive light in response to being exposed to a light (or electromagnetic radiation) source. As the particles pass one-by-one, they may be exposed to a beam of electromagnetic radiation (for example, light of a given wavelength) generated by a laser and emitted along a beam path (and optionally associated optics) to the particle interrogation location. Such associated optics may include lenses, filters, or the like. The exposure of the particles (including particles stained with a dye) to the electromagnetic radiation may cause a responsive event, including light scattering, absorption, and/or fluorescence emitted by stained particles. In some aspects, the amount of fluorescently generated light may vary by a detectable degree, depending on whether sperm cell particles bear an X chromosome or Y chromosome.

The fluorescently generated light may be received by optics (for example, lenses, filters, or the like), and it may be focused onto an active area of a photodetector. According to certain inventive techniques, the photodetector may include an APD or PMT. The photodetector may generate an output signal that corresponds (varies linearly or non-linearly) to the amount of electromagnetic radiation (for example, light of a given wavelength) that it receives from the interrogation location. The photodetector output signal may include a time-varying analog signal indicative of an intensity of the received electromagnetic radiation. This photodetector output signal may ultimately be communicated to a processor (which may include one processor or a plurality of processors that control a portion of the operation or the entire operation of the flow cytometer or the sorting apparatus). The photodetector output signal may be amplified by at least one amplifier (or two or more amplifiers in series) before it is communicated to the processor. Furthermore, the photodetector output signal (for example, as amplified) may be digitized before being communicated to the processor.

In a further aspect, the system may include a processor that receives a signal, and generates even data. The processor may further compile event data into one or more data sets. The processor may further distribute event data in the data set, makes discrimination value calculation; classifies events based on discrimination value and makes sort decision; and/or provide instruction to sorting apparatus. The processor may comprise a single component or may comprise multiple components. The processor is configured to analyze the digitized output signal received from the flow cytometry apparatus. In general, electrical signals from the cytometer detector (i.e. PMT or APD) are converted to digital information by an A/D converter which supplies the corresponding digital information to the microprocessor. In response to the information, the microprocessor controls a sorting system.

The electrical signals output from the photodetector of the cytometry system are time-varying analog voltage signals indicative of the amplitude of the emitted fluorescence at any instant in time generated by each particle as it is illuminated by the laser beam. Thus, the analog signals (also referred to as analog output) are in the shape of time-varying waveform pulses. In general, a waveform pulse is defined as a waveform or a portion of a waveform containing one or more pulses or some portion of a pulse. Thus, the amplitude of each waveform pulse at any instant in time represents the relative rate of photon emission of each cell at that instant in time as the cell passes through the laser beam. In one embodiment, X chromosome bovine sperm cells have a higher DNA content than Y chromosome bovine sperm cells (e.g., about 3.8%). As a result, live X cells labeled with a fluorescent stain as noted above will produce a different waveform pulse 497 than pulses from any other labeled cells. By analyzing the pulses as noted below (see Signal Processing, Slit Scanning, and Critical Slope Difference), each cell can be identified as an X cell or not identified as an X cell (~X). In general, as used herein, X cells refers to live X cells, Y cells refers to live Y cells and ~X cells refers to the combination of live Y cells and cells which otherwise produce a detectable fluorescence emission but which cannot be identified with a reasonable probability as being live X cells.

The timing of each waveform pulse indicates the position of each cell in the stream. Since the rate at which the particles are being delivered through cytometer remains constant, and since the distance between the detector and the sorting apparatus is known, the position of each particle known. Thus, the microprocessor can calculate the instant at which a sorting event occurs (i.e. when the ablation laser is fired). Since the microprocessor receives event data for each particle, including the characteristics for the particle, the microprocessor may keep track of (or enumerate) the number of particles that can be classified in each subpopulation. Depending on the parameter set and sorting strategy implemented by the control apparatus, see below, the microprocessor determines how the particles it the mixture of particles are sorted.

In another aspect, the system includes a control, in the form of a microprocessor (or other digital or analog control and/or processor, or combinations thereof) that controls the discrimination of particles within the mixture of cells. In a further aspect, this control apparatus receives information from the cytometer apparatus, including measured characteristic data for particles in the mixture of particles. The control further includes the information present in the parameter set. The control is capable, using these sources of information, of distinguishing the values of measured characteristics for sub-populations in a set of particles; assigning a critical range of values to two or more sub-populations based on the distinguished values of the measured characteristic; measuring a second set of particles in the mixture of particles, and distinguishing the values of the measured characteristics for sub-populations in the second set of particles; updating critical range of values assigned for the subpopulations using the values of the measured characteristic for the subpopulations distinguished for the second set of particles; and classifying particles in the mixture according to a sub-population classification, using the updated critical range of values. The control provides output signals to control the sorting system based on the classification. The control may be implemented within a single microprocessor. Alternatively, some or all functions may be integrated into one or more processors. In addition, the processing may be implemented by an analog circuit or a combination of analog and digital circuitry.

The control may provide output signals to other parts of the cytometry system. Further, the control may be adapted to process information and provide output signals in real time. Broadly speaking, the term "real time" refers to operations in which the operation of the control apparatus matches the human perception of time or those in which the rate of the operation of the processor or processors comprising the control matches the rate of relevant physical or external processes. In one context, the term "real time" can indicate that the system reacts to events before the events become obsolete.

In another aspect, the systems of the present invention include a sorting apparatus. The sorting apparatus carries out a sorting operation on the particles in the mixture of particles, according to the instructions received from the control apparatus. The sorting apparatus can be any type of sorter known to a person of skill in the art, including for example a droplet sorter, a mechanical sorter, a laser ablation ("zapper") system, or using any other technique known to a person of skill in the art]. In one embodiment, the sorting system comprises a focused energy apparatus, as described in U.S. Pat. No. 9,588,100. A focused energy apparatus is used to provide focused energy pulses to the particles. The focused energy apparatus may be a thermal, electrical, optical, or electromagnetic device, which would have a desired wavelength, and would deliver high peak power with a very high repetition rate (or pulse frequency), to the target particles. In one embodiment, the focused energy apparatus is triggered a predetermined time (i.e., milliseconds) after activation by the controller (the timing being set based upon the traveling speed of particles through the channel) and issues a pulse to the selected or targeted (i.e., unwanted) particle.

Examples of pulsed lasers include mode-locked, Q-switch, as well as those lasers using both mode-locking and Q-switch techniques. For example, a focused energy device such as an Avia 355-5-100 (made by Coherent, Inc., Santa Clara, Calif.), or the Explorer XP lasers Q-switch laser from Spectra-Physics Inc., is capable of operating in a pulse-on-demand mode, and can deliver 15 ns energy pulses or less, at a rate of over 1000 pulses per second, to the target objects. In one embodiment, pulse energy levels of 0.5-8.0 µJ are used, and in a preferable embodiment, a Q-switch laser in pulse-on-demand mode is used to deliver an average pulse energy of 1.8 µJ with a range for individual pulses of 1.3 µJ to 2.3 µJ. In one embodiment, the pulse width ranges from 3 nanoseconds to 1 microsecond, and preferably, is in a range of 5-9 nanoseconds. However, one of ordinary skill in the art would know that any high power laser existing now, or later developed, with the appropriate high energy pulses and pulse frequency, would be suitable for the present invention in order to achieve the desired target accuracy and/or effect.

In one embodiment, the need for a tight action region in order to deliver the pulsed energy from the focused energy apparatus to target particles or a surrounding region thereof, is important to minimize the potential impact of delivering the energy outside of the targeted particles or region, to otherwise unselected, or non-targeted particles. For example, a focused energy apparatus such as the Explorer XP 355-1 Q-switch laser, is capable of delivering <4% rms, providing high pulse-to-pulse stability when fired at regular uniform intervals. However, for flow cytometric analysis and action systems where particles or cells enter the action region in non-uniform intervals, additional measures are employed to deliver uniform pulse energy to impinge only the targeted particles or cells, or the surrounding region thereof. Such measures include matching laser performance parameters such as pulse length and peak power levels, to enable the system of the present invention to achieve a desired target accuracy (i.e., in one embodiment, photodamage or kill rate of 95% or higher hit rate on target particles). In addition, further tuning the pulse-on-demand operation and performance of the laser to deliver extremely high pulse-to-pulse stability when fired at non-uniform intervals, greatly reduces the spatial variability in the area impacted by the pulse. Thus, by reducing pulse-to-pulse variability in the focused energy device, the unintended action, damage or destruction to non-target particles or cells, is greatly reduced, achieving, for example, an 85% or higher rate of viability for live, non-target particles or cells.

The focused energy apparatus can be set to damage, alter, disable, kill or destroy the targeted or unwanted particle or cell in the sample fluid with a pulse, or to activate one of several mechanisms in the particle or cell, such that cell damage or death ensues. However, depending on the desired arrangement, the targeted or selected particle may be wanted objects, in which case the focused energy apparatus is not activated or triggered, or the targeted or selected particles may be unwanted particles, where the focused energy apparatus is activated act upon the particles, such as to damage, alter, disable, kill or destroy the selected, unwanted particles. However, these are not the only embodiments, and the various embodiments are discussed further below.

In one embodiment, when the selected particle or cell is damaged, altered, disabled, killed, or destroyed by the focused energy device, the particle or cell continues to flow through the channel, and into container, along with any non-targeted particles or cells. Any sheath or buffer fluids also proceed in laminar flow through output channels.

Accordingly, in one embodiment, the present methods and systems are capable of producing a discriminated product of particles or cells in a container, including a high viability of non-target or wanted particles or cells, and a high percentage of photodamaged, altered, disabled, destroyed, or dead target particles or cells.

Sorting Methods

In another aspect, a method is provided for identifying subpopulations within a mixture of particles. The mixture of particles may contain two or more sub-populations. The subpopulations may be distinguishable from one another by a characteristic, or more than one characteristics. The method comprises measuring a characteristic of a first set of particles in the mixture of particles. The method further comprises distinguishing the values of the measured characteristics for sub-populations in the set of particles. In one aspect, values of the measured characteristics may be distinguished for two or more sub-populations in the set of particles. In another aspect, values of the measured characteristics may be distinguished for each of the sub-populations in the set of particles. The method further comprises assigning a critical range of values to two or more sub-populations based on the distinguished values of the measured characteristic. The assigning of a critical range can be by identifying (or making a classification of) a sub-population in relation to other subpopulations based on the distinguished values of the measured characteristic for each of the subpopulations being compared. Subsequent to the assignment of a critical range of values, the method further comprises measuring a second set of particles in the mixture of particles, and distinguishing the values of the measured characteristics for sub-populations in the second set of particles. The critical range of values assigned for the subpopulations is then updated using the values of the measured characteristic for the subpopulations distinguished for the second set of particles. The method further comprises classifying particles in the mixture according to a subpopulation classification, using the updated critical range of values.

In one aspect, the methods of the present invention are performed on a mixture of particles in order to identify, discriminate, distinguish, or sort the particles within the mixture. The mixture of particles may contain two or more subpopulations. The subpopulations may be distinguishable from one another by a characteristic, or more than one characteristics. The particles may be cells. The cells may be of a single type, or may be a mixture of multiple cell types, such as a mixture of cells derived from a tissue, or present in blood or blood parts. In a further aspect, the cells may be sperm cells. The sperm cells may be from any type of animal. In a further aspect, the sperm cells are from non-human mammals. In a further aspect, the sperm cells are from livestock animals. Livestock animals can include, but are not limited to fowl, ungulates, ruminants. In a further aspect, the sperm cells are ovine, caprine, equine, porcine, or bovine. Bovine sperm cells can include sperm cells from domestic cattle, bison, African buffalo, water buffalo, or yak.

In another aspect, characteristics of particles or sets of particles are detected and measured. Characteristic can be any aspect of a particle that can be detected. Characteristics may include aspects such as size, shape, permeability, integrity, content, vitality, mortality, metabolic status, and surface markers. In a further aspect, the characteristics may include DNA content. DNA content, particularly in haploid cells such as sperm cells or ova, is an indicator of the presence of one of the two sex chromosomes. The X-chromosome is larger than the Y chromosome, and therefore a haploid cell that contains an X-chromosome will contain more total DNA than a gamete that contains a Y-chromosome. The characteristic can be detected using a variety of methods knows to a person of skill in the art, including light scatter, interference, absorbance, or detection of fluorescence. For example, the characteristic of DNA content of a cell can be detected by staining the cell with a DNA-binding fluorescent dye, and detecting the fluorescence of the dye. In certain respect, characteristics of particles are measured using a flow cytometer. The use of flow cytometers for detection and measurement of characteristics is known in the art, but in general cytometers operate by converting the incidence of a photon with a detector into an electrical signal. He electrical signal from the detector therefore corresponds to the electromagnetic radiation from a particle (in the form of photons emitted by or scattered from the particle) upon exposure to a source of electromagnetic radiation. Frequently, fluorescent molecules are utilized to specifically label a particular aspect of the particle, and the cytometer detects photons of a specific wavelength emitted by the particle in response to exposure of the particle to certain electromagnetic radiation. The electromagnetic radiation from the particle, indicative of a characteristic, is detected by a detector within the cytometer apparatus. The detector is usually either a photomultiplier tube (PMT) or an avalanche photodiode (PMT) as described in U.S. Pat. No. 10,069,027. The detector converts photons into an electrical signal that can be transmitted to the processing components of the cytometer, resulting in the assignment of values to the detected characteristic. Distinguishing values of the measured characteristics, based on the valuation derived from the cytometer, may further involve sorting and comparing values for particles or sets of particles to elucidate the features of subpopulations within the mixture of particles. This can be achieved, for example, by determining whether the values, when represented graphically, form groups or peaks. The identity of the subpopulations can then be ascertained based on the relationship of any groups or peaks that are thus elucidated. In some aspects, the distinguishing can be through finding discrete groupings of events based on the measured characteristic or characteristics. The measured characteristics can be represented in a feature space. A feature space, for example, can be a graphical representation of or more measured characteristics of the particles. In one exemplary embodiment, the feature space can be a histogram of fluorescent intensities, or a scatter plot of fluorescent intensities and total fluorescence, wherein the fluorescence is indicative of the amount of DNA present in a cell. In some aspects, the distinguishing can be discrimination between two sub-populations, discrimination of a single subpopulation amongst several, or discrimination of a subpopulation within a continuum.

In further aspects, event data is generated for particles by the cytometer apparatus. The event data is typically generated based on the detection of electromagnetic radiation emitted by, or scattered from, particles upon exposure to a source of electromagnetic radiation. The electromagnetic radiation is converted into electrical signals by a detector (usually either a PMT or and APD). The electrical signal is then converted into data by the processor components of the cytometer. In certain embodiments, the event data may be fluorescence intensity (i.e. the highest fluorescence value for an individual event corresponding to a single particle) and/or the total fluorescence (i.e. the integrated fluorescence values for the entire event corresponding to a single particle).

In certain aspects, the methods of the present invention involve discrete actions carried out on particular sets of particles. For example, the measuring a characteristic of particles in a mixture of particles and distinguishing of values of the measured characteristics can be performed on a first set of particles from a mixture of particles, and subsequently the measuring a characteristic of particles in a mixture of particles and distinguishing of values of the measured characteristics can be performed on a second set of particles from the same mixture of particles.

In a further aspect, the methods involve assigning a critical range of values to each of the sub-populations based on the previously distinguished values of the measured characteristics. In certain respects, the assigning of critical ranges is used to identify specific subpopulations within the mixture of particles. For example, a critical range may be assigned to a set of particles to identify that set of particles, based on the relationship of the peak formed by the values for those particles represented graphically, in relation to the peak of values for other particles. The assignment of a critical range of values may include the calculation of a discrimination value. The discrimination value can be a threshold discrimination value (single value or two values) or gate threshold values (e.g. three or more values). The calculation may use one or more values from the parameter set. In certain embodiments, the calculation of a discrimination value involves identifying at least one critical value for a first characteristic from the distribution of event data for the first set of particles; obtaining the values for a second characteristic associated with the critical value for the first characteristic; producing a distribution of the values for the second characteristic; identifying at least one critical value for the second characteristic from the distribution of values for the second characteristic; co-locating the critical values for the first and second characteristics in a feature space; and determining the at least one discrimination values from the critical values co-located in the feature space. In further aspects, calculation of a discrimination value may further involve adjusting the critical values to include event data from a second set of particles. In further aspects, the critical values comprise one or more peak characteristic values for a first sub-population, and one or more peak characteristic values for a second subpopulation. The peak characteristic values comprise peak fluorescence intensity and peak total fluorescence. In further aspects, the critical values may also a trough value between the peak characteristic values for the first and second subpopulations.

In a further aspect, the methods may include measuring the characteristics of and distinguishing the values of the measured characteristics for each of the sub-populations in the second set of particles in the mixture of particles, which occurs subsequent to the assigning a critical range of values for the first set of particles. This measuring and distinguishing on the second set of particles is carried out in order to determine whether the assignment of the critical range of values to the sub-populations is accurate, and if not, to update the values used to make that assignment. In some aspect, the values for the second set of particles is compared to those for the first set of particles, and if they are not different, the critical range of values assigned based on the first set of particles is used. If there is a difference in the values for the first set of particles and the second set of particles, the critical range of values is updated using the values for the second set of particles. based on the distinguishing of the values of the measured characteristics for each of the sub-populations in the second set of particles. Typically, a certain number of particles, or the number of particles that can be measured in a set amount of time, dictates the composition of each set of particles, and therefore how often the critical range of values is updated. The number of particles that comprises a set and/;or time value is part of the parameter set.

In a further aspect, individual particles in the mixture of particles are assigned a classification based on the assigned critical range of values. This can be based on a critical range of values that is or is not updated as a result of a new set of particles being measured. This classification of particles is derived from the relationship of the subpopulations to one another. Individual particles in the mixture can be classified as belonging to a subpopulation according to this assignment of critical values, while as the same time these same particles that are classified are part of a second set of particles used to update the critical range of values.

In a further aspect, the methods of the present invention provide for identifying subpopulations within a mixture of particles by defining gates to discriminate one or more subpopulations of particles within a mixture. As the particles within the mixture are processed by flow cytometry, the particles are detected by the detector apparatus of the flow cytometer, generating a detector event. Each detector event can be an aggregation of values, including, for example, values for intensity and area of a signal. A computer is used to process the event data. Event data is accumulated until the data for a sufficient number of events has been compiled to permit the calculation of one or more discrimination values. A parameter set, that is a set of values that affect certain details of all discrimination value calculations, are provided before any discrimination values are calculated. When sufficient event data has been compiled, a discrimination value is calculated, and the process is repeated with a new set of event data. Each set of event data is the previous set of event data to determine whether the discrimination value calculated for the subsequent set of event data is significantly different from the previous discrimination value calculated from the previous set of event data. If it is not significantly different, data resulting from the previous discrimination value calculation, if available, may be averaged with data from the subsequent discrimination value to improve consistency of location and shape between consecutively-calculated discrimination values. If the discrimination value is significantly different, data for the previously calculated discrimination value is discarded.

In certain aspects of the methods, a mixture of particles is provided. The composition of the mixture can vary according to the application. The mixture may include particles and medium. In certain embodiments, the mixture of particles is a sperm samples. The sperm cell may be present with components of raw ejaculate, with other media, and/or extender. The mixture of particles is delivered to a flow cytometry system.

In certain aspects, a parameter set is provided. The parameter set is provided to the processor for calculation of one or more discrimination values. The parameter set includes a set of values that affect certain details of all discrimination value calculations. In some respects, the parameter set includes values that are used to calculate a threshold value. In other aspects, the parameter set includes values that are used to calculate one or more points or vertices of gate. In further aspects, the parameter set includes the frequency at which calculation of a discrimination value is to occur, and/or the quantum of event data that triggers calculation of a discrimination value.

In certain aspects, the characteristics of particles in the mixture are detected. This detection is performed by the cytometry apparatus. The cytometer detects characteristics by detecting aspects of individual particles. The detection of characteristics of an individual cell is considered a single event. In some cases, the particles may arrive at the detector as clumps of particles, and thus the detection will proceed for the clumped cells as a single event. These aspects can include size and shape of the particle, for example by detecting light scatter, and particle composition, for example by detecting the presence of a fluorescent marker on the surface of the particle or within the particle. In certain respects, the particle aspect being detected may be a fluorescent dye. In further respects, the particle may be a cell, and the dye may be a fluorescent DNA dye. One or more characteristic may be detected for each particle, and a single event may include one or more detected characteristics. The detector of the cytometry apparatus generates a signal that corresponds to the detected characteristic or characteristics for each event and provides that signal to a processor (e.g. a CPU).

Compiled event data is distributed. Occurrence of data distribution may depend on one or more values from the parameter set—frequency or number of events. In some respects, the distribution may be a sorting of events by event area. In other respects, the distribution may be sorting of events by intensity. In further respects, the distribution may be sorting of events by intensity and area.

In a further aspect the classification of events is provided to the sorting apparatus, which implements the sort/no-sort decision.

The discrimination value calculated for a set of compiled events is compared to the discrimination value calculated for the previous set of events. Repeat steps to generate a new discrimination value based on a new compiled set of event data.If different, discard previous; if not different, average event data.This can be done by comparing the calculated discrimination values directly, or by comparing the data in the two compiled data sets.

In a further aspect, the methods of the present invention can be carried out in the following manner:

1. Obtain the parameter set.
2. Get the frequency of gate calculation from the parameter set.
3. Get the maximum number of events whose data will be directly used for a gate calculation from the parameter set. (Note—each event has an 'intensity' that is a measure of the maximum instantaneous fluorescence and an 'area' that is the integral of the intensity over the duration of the event.)
4. As events are generated by the detector, add each event to the event data set used to calculate the gate. If the maximum number of events is already present, add the new event and ignore the oldest events in subsequent gate determination.
5. Periodically according to step 2, determine whether enough events have been accumulated to attempt to calculate a gate, and if so, continue with step 6.
6. Sort accumulated events by area. Save the median value of event areas from this data set.
7. Sort accumulated events by intensity, then secondarily by area. Save the median value of event intensities from this data set.
8. Determine whether the character of event data has changed significantly since the last calculation by comparing the median values of intensity and area against the corresponding median values from the data set for the last calculation. (If no previous median values are available, proceed as though there has not been a significant change.)
9. If the character of event data has changed significantly (from step 8), first save, then clear data related to previous gates so that it will not affect the gate resulting from the current data set. For example, "forget" the old data that might be averaged with the current data in steps 32, 57, and all other similar steps.
10. Create a histogram of the intensity values from all the events. The range of values which are placed in histogram bins is 0 to 65535, and they are sorted into 512 equal-sized bins that collectively cover the full range.
11. Calculate the bin numbers corresponding to 25% from the left edge of the histogram and 15% from the right edge of the histogram. With 512 bins, these numbers correspond to 128 and 435.
12. Find the three highest peaks in the area of the histogram bounded by the limits determined in step 11. A peak in the histogram is a bin whose number of counts is greater than the counts in bins on either side.
13. Sort the bin numbers of the histogram peaks from step 12 in descending order by bin height (number of events in each bin).
14. Examine all peaks within the area of the histogram that is outside the limits determined in step 11. If any of them are higher than the second-highest peak identified in step 13, flag a gate calculation error and wait for a new event data set to be available.
15. There will be some species-dependent range of intensity differences between male and female peaks which conforms to expectations. Call this the required intensity difference. Determine the intensity differences between the three highest peaks from step 13, taking the peaks in pairs. There are three pairs: peaks 1 & 2, peaks 1 & 3, and peaks 2 & 3.
16. If no pair of peaks exhibit the required intensity difference, flag a calculation error and wait for a new event data set to be available.
17. If the difference between only one of the pairs in step 15 is the required intensity difference, then that pair of histogram peaks represents the male and female peaks. If the third peak that is not in that pair is the tallest of the three peaks from step 12, flag a calculation error and wait for a new event data set to be available.

18. If step 17 did not identify the male and female histogram peaks, then determine if two pairs of the highest peaks both exhibit the required intensity difference. If two pairs do, then either all three peaks in order by bin number are equally spaced (case A), or two of the highest peaks are very close together (one is a spike and both represent the same male or female peak) and the third represents the peak for the other sex (case B). Examine the spacing to determine whether case A or B is true.

19. If case A in step 18 is encountered, then the center peak is either the male or female peak. Of the left and right peaks, one of them must be less than two-thirds the height of the other. If this is not true, flag a calculation error and wait for a new event data set to be available. If it is true, the taller of the left and right peaks is the other sex' peak; the center peak and the taller of the two outer peaks are the male and female peaks. The peak on the left will be either the male peak or the female peak, depending on the species of the sample source.

20. If case B in step 18 is encountered, then select the histogram peak that is in both the pairs of peaks exhibiting the required intensity difference as one of the relevant (male or female) histogram peaks, and consider the other two histogram peaks as the other relevant peak, to be processed further to determine which is a spike of the peak and which is the main peak (see step 21).

21. If case B in step 18 is encountered, then find the widths of the two histogram peaks which represent the remaining peak of interest and a spike of that peak. Calculate the widths by finding the bin of the lowest point (the trough) between them, and, moving outwards from the trough, find the first bin in both directions which is of lower height than the trough. The number of bins from the trough bin to the first lower bin is the width of the peak in that direction. Take the narrower of the two peaks as the spike, and the wider one as the second peak of interest (the male or female peak).

22. If the two peaks identified as male and female peaks are not the two highest peaks, flag a calculation error and wait for a new event data set to be available. If they are, assign the right-most of the two peaks to be the female intensity peak, and the left-most to be the male intensity peak, or vice versa depending on the species of the source from which the sample was obtained.

23. Identify the lowest histogram bin between the identified male and female peaks as the trough.

24. Calculate the peak-to-trough ratio (P2T ratio) as ((P1+P2)/2)/T, where P1 and P2 are the counts in the male and female intensity histogram peak bins respectively, and T is the counts in the trough bin. Also, retrieve the peak-to-trough threshold value (P2T threshold) from the parameter set. Also, calculate the peak dominance value as (P2−T)/(P1−T), and retrieve the minPeakDominance value from the parameter set.

25. Compare the P2T ratio calculated in step 24 to the P2T threshold value. If the peak-to-trough ratio is less than the threshold value, flag an error and wait for a new data set to be available. Also, compare the peak dominance value to the minPeakDominance value. If the peak dominance value is less than the minPeakDominance value, flag an error and wait for a new data set to be available.

26. For both male and female peaks, calculate the number of bins from the trough to the histogram peak.

27. For male and female histogram peaks, calculate the peak widths in bins as double the respective values found in step 26, plus 1.

28. For male and female histogram peaks, calculate the number of histogram bins to use as points (x,y=bin number, count) to fit a curve to. Calculate it as the peak width from step 27, except if the peak width is greater than nine, set the number of bins to nine.

29. For male and female histogram peaks, find a more precise estimate of the male and female peak locations by applying a polynomial best-fit algorithm to the bins around the peak, using the number of bins calculated in step 28 as the number of points to fit the curve to; then apply the Newton-Raphson algorithm to find the intensity corresponding to the location of zero slope in the fitted polynomial. This more precise estimate of the peak is a non-integral bin number with decimal places.

30. Apply a polynomial best-fit algorithm to the five bins centered at the trough bin from step 23. Then apply the Newton-Raphson algorithm to find the intensity corresponding to the location of zero slope in the fitted polynomial. This more precise estimate of the trough is a non-integral bin number with decimal places.

31. If the difference between the estimate of the trough from step 30 and the number of the bin where the trough is initially found in step 23 is greater than 1.0, adjust the precise estimate to be the trough bin from step 23 plus or minus 1.0 depending on whether the precise estimate from step 30 is greater than or less than the trough bin from step 23.

32. Calculate the average of the trough value from step 31 and the trough values from step 31 which were obtained in the last five event data sets. Use this average value as the trough value obtained from this data set.

33. Multiply the width of the range of intensity values (65536) by 0.003. The product is 196.608.

34. Convert the male and female histogram peak locations, as bin numbers, to intensity values by multiplying the precise bin number by the bin width. For example, if the female histogram peak location from step 29 is 257.358, and there are 512 histogram bins for the range 0 to 65535, then the bin width is 128, and obtain the intensity peak in the 0 to 65535 range by multiplying 257.358×128=32942.6.

35. Using the product of the calculation in step 33 and the male and female histogram peak locations converted to intensity values from step 34, find the subset of events whose intensity values are within the distance of the peak given by the product from step 33. Do this separately for the male and female peaks. For example, if the female intensity peak is 32942.6, find the subset of events in the event data set that have intensities in the range [32942.6−196.608, 32942.6+196.608], i.e. events with intensities between 32746 and 33139. Do the same for a set of events with intensities near the male histogram peak.

36. Perform the following steps 37 to 54 separately for both male and female peaks, to find the 'area' coordinates of the peaks in the (intensity, area) plane in which the gate is to be drawn. These steps use only event data from events selected in step 35.

37. Create an array of the area values in the events selected in step 35. Sort it in ascending order.

38. Calculate the number equal to 75% of the number of area values in the array in step 37. Call it numValuesIn75Pct for purposes of this process description.
39. Calculate the number equal to 99% of the number of area values in the array in step 37. Call it largestRetainedIndex for purposes of this process description.
40. In subsequent steps, ignore all area values greater than the value at the $99^{th}$ percentile, i.e. all values in the array with array indices greater than largestRetainedIndex (the index calculated in step 39).
41. Find the area value which marks the $75^{th}$ percentile of area values, using numValuesIn75pct from step 38. Call that value 'lowest75pct Max' for purposes of this process description.
42. Find the smallest area value in the array from step 37. Call that value 'lowest75pct Min' for purposes of this process description.
43. Calculate lowest75pct Max−lowest75pct Min, which represents the range of area values which are not ignored as mentioned in step 40. Call this difference 'areaRange' for purposes of this process description.
44. Calculate the variable width of the 'area' histogram bins as: areaBinWidth=areaRange/512
45. Calculate the value (largestRetainedArea/areaBinWidth)+1, and call it 'numberOfAreaBins' for purposes of this process description.
46. Find the value in the array from step 37 which is at the array index 'largestRetainedIndex'. Call that value 'largestRetainedArea' for purposes of this process description.
47. If there are very few selected events to look at, such that largestRetainedIndex<(6×numberOfAreaBins from step 45) then recalculate areaBinWidth according to: numberOfAreaBins=(largestRetainedIndex/6)+1 If(numberOfAreaBins<4) numberOfAreaBins=4;
areaBinWidth=largestRetainedArea/(numberOfAreaBins−1)

48. Create a histogram of the area values in the array from step 37, ignoring all values in the array with array indices greater than largestRetainedIndex as mentioned in step 40.
49. Create another histogram of area values using the same number of bins, which is smoothed by averaging the count of values in each bin from step 48 with the counts in the seven bins (from step 48) on both sides, i.e. average together 15 values.
50. Find the bin in the smoothed area histogram from step 49 which has the most counts.
51. Multiply the number of counts in the bin from step 50 by 0.2.
52. Moving left (smaller array indices) from the bin with the most counts, find the first bin with fewer counts than the product calculated in step 51.
53. Moving right (larger array indices) from the bin with the most counts, find the first bin with fewer counts than the product calculated in step 51.
54. Use a least-squares polynomial curve-fitting algorithm to find a tenth-degree polynomial that approximates the region of the smoothed histogram between the bins found in steps 52 and 53. Using the Newton-Raphson algorithm, find the location where the slope of the polynomial is zero and use this location as the area value of the peak.
55. With the (intensity, area) locations of the male and female peaks now known, calculate the location of the point in the (intensity, area) coordinate space which is on a line that passes through the male and female peaks, and which has the intensity coordinate of the trough calculated in step 32. This point is the trough location in the (intensity, area) coordinate space.
56. If the area coordinates for the male is above the area coordinate for the female peak—or below it, depending on the species of the sample source—flag an error and wait for the next event data set.
57. Calculate a value for the female peak intensity coordinate from step 29 which has been adjusted for drift in the electronics that has occurred since the event data set was processed, for each of the female peak intensity coordinates from the last thirty event data sets. If there are fewer than thirty previous values available, average only the values that are available. Call the averaged value the 'averaged female peak intensity' for purposes of this process description. (The process for calculating drift-adjusted coordinates is described in the set of steps that is enumerated with letters instead of numbers.)
58. Calculate a value for the male peak intensity coordinate from step 29 which has been adjusted for drift in the electronics that has occurred since the event data set was processed, for each of the male peak intensity coordinates from the last thirty event data sets. Average the drift-adjusted male peak intensity coordinates with the male intensity coordinate from step 29 from processing this event data set. If there are fewer than thirty previous values available, average only the values that are available. Call the averaged value the 'averaged male peak intensity' for purposes of this process description. (The process for calculating drift-adjusted coordinates is described in the set of steps that is enumerated with letters instead of numbers.)
59. Calculate a value for trough intensity coordinate from step 32 which has been adjusted for drift in the electronics that has occurred since the event data set was processed, for each of the trough intensity coordinates from the last thirty event data sets. Average the drift-adjusted trough intensity coordinates with the trough intensity coordinate from step 32 from processing this data set. If there are fewer than thirty previous values available, average only the values that are available. Call the averaged value the 'averaged trough intensity' for purposes of this process description. (The process for calculating drift-adjusted coordinates is described in the set of steps that is enumerated with letters instead of numbers.)
60. Calculate the difference between the trough intensity from step 32 and the peak intensity of the peak relative to which the gate is drawn from step 29. Call this distance the peak-to-trough intensity distance.
61. Average the peak-to-trough intensity distance from step 60 with the peak-to-trough intensity distances found in step 60 from the last thirty event data sets. If there are fewer than thirty previous values available, average only the values that are available. Call the averaged value the 'averaged peak-to-trough intensity distance' for purposes of this process description.
62. Create a gate in the shape of a polygon in the (intensity, area) coordinate plane based on the location of the peak of interest, which has eight vertices. Start this stage of the process by obtaining the encroachmentPct value from the parameter set. Divide it by 100.0, and subtract the result from 1.0 to obtain the 'encroachmentMultiplier' used in subsequent steps.

63. Multiply the averaged peak-to-trough intensity distance by the encroachmentMultiplier from step 62. Call the product the 'encroachmentAdjustment' for purposes of this process description.

64. Calculate a value called the 'encroachment intensity' for purposes of this process description. Two vertices lie on a vertical line drawn through the encroachment intensity. If the gate is being created relative to the male peak, the encroachment intensity is the averaged male peak intensity plus the encroachmentAdjustment. For the male peak, the encroachment intensity is the intensity coordinate of the vertex or vertices of the gate which are furthest to the right on the intensity axis in the (intensity, area) plane. If the gate is being created relative to the female peak, the encroachment intensity is the averaged female peak intensity minus the encroachmentAdjustment. For the female peak, the encroachment intensity is the intensity coordinate of the vertex or vertices of the gate which are furthest to the left on the intensity axis in the (intensity, area) plane.

65. Retrieve the peakFalloffPct value from the parameter set. This is a decimal value in the range 0.0 to 100.0. Currently 65.0 is used, but some other value may eventually be determined to be best. Divide peakFalloffPct by 100.0, then multiply it by the height of the highest bin in the relevant peak in the intensity histogram (step 10). The relevant peak is the male intensity peak or the female intensity peak, depending on which peak the gate is being calculated relative to. Call the product of the multiplication the 'falloffValue' for purposes of this process description.

66. Starting with the highest intensity histogram bin in the relevant peak, move away from the trough bin of step 23 until the height of the bin currently examined is less than or equal to falloffValue. Calculate the intensity value corresponding to the center of this bin as [bin index+0.5]×[bin width]. Call this value the "falloff intensity" for purposes of this process description.

67. Average the falloff intensity from step 66 with the falloff intensities from the last thirty event data sets. If there are fewer than thirty previous values available, average only the values that are available. Call the averaged value the 'averaged falloff intensity' for purposes of this process description.

68. Take the averaged falloff intensity as the initial value for the intensity coordinate in the (intensity, area) plane of the two gate vertices which are furthest to the right in a gate drawn relative to the female peak, or furthest to the left in a gate drawn relative to the male peak.

69. Retrieve the 'octExtension' value from the parameter set. octExtension is a decimal value greater than 0.0. Currently the value 0.6 is used, but that may be changed in the future. Multiply octExtension by the averaged peak-to-trough intensity distance from step 61. Call the value the "extension distance" for purposes of this process description.

70. If the gate is being drawn relative to the male peak, subtract the extension distance from step 69 from the initial value computed in step 68. If it is being drawn relative to the female peak, add the extension distance to the initial value. Use the result as the final value for the intensity coordinate in the (intensity, area) plane of the two gate vertices which are furthest to the right in a gate drawn relative to the female peak, or furthest to the left in a gate drawn relative to the male peak.

71. Calculate the average of the encroachment intensity and the averaged female peak intensity, for a gate drawn relative to the female peak, or the averaged male peak intensity, for a gate drawn relative to the male peak.

72. Retrieve the 'horizAdjMultiplier1' value from the parameter set. Multiply it by the averaged peak-to-trough intensity distance from step 61. Add the product to the value computed in step 71. For a gate relative to the female peak, the result is used as the intensity coordinate in the (intensity, area) plane for two vertices on a vertical line which is to the right of the encroachment intensity. For a gate relative to the male peak, the line is to the left of the encroachment intensity. The value of 0.0 is currently used for horizAdjMultiplier1, but that may be changed.

73. Calculate the average of the averaged falloff intensity and either the averaged female peak intensity, for a gate drawn relative to the female peak, or the averaged male peak intensity, for a gate drawn relative to the male peak.

74. Retrieve the 'horizAdjMultiplier2' value from the parameter set. Multiply it by the averaged peak-to-trough intensity distance from step 61. Add the product to the value computed in step 73. For a gate relative to the female peak, the result is used as the intensity coordinate in the (intensity, area) plane for two vertices on a vertical line which is to the right of the line calculated in step 72 and to the left of a line drawn through the falloff intensity. For a gate relative to the male peak, the line is to the left of the line calculated in step 72 and to the right of a line drawn through the falloff intensity. The value of 0.0 is currently used for horizAdjMultiplier2, but that may be changed.

75. Calculate the difference between the trough 'area' coordinate from step 55 and the peak area coordinate of the peak relative to which the gate is drawn from step 29. Call this distance the peak-to-trough area distance.

76. Average the peak-to-trough area distance from step 75 with the peak-to-trough area distances found in step 75 from the last thirty event data sets. If there are fewer than thirty previous values available, average only the values that are available. Call the averaged value the 'averaged peak-to-trough area distance' for purposes of this process description.

77. Consider an "axis line" drawn through the (intensity, area) male and female peaks. Two of the gate vertices lie on the line with intensity computed in step 72, one above the axis and one below the axis. Compute the intersecting (intensity, area) point where the axis and the vertical line of step 72 intersect. Then compute the 'area' coordinate of the vertex on the vertical line and above the axis by retrieving the value of "areaAboveMultiplier" from the parameter set and multiplying it by the averaged peak-to-trough area distance of step 76, and adding the result to the area coordinate of the point of intersection.

78. Compute the 'area' coordinate of the vertex on the line of step 72 which is below the axis by retrieving the value of "areaBelowMultiplier" from the parameter set and multiplying it by the averaged peak-to-trough area distance of step 76, and subtracting the result from the area coordinate of the point of intersection.

79. Two vertices are on a vertical line drawn through the encroachment point, one above the axis line and one below it. Compute the point where the vertical line at the encroachment intensity and the axis line intersect; call that point the "encroachment point" for purposes of this process description. Compute the 'area' coordinate of the vertex with the encroachment intensity and above the axis line by retrieving the value of aboveHeightPctLeft from the parameter set, dividing it by 100.0, and multiplying it by the length of the vertical line segment from the vertex computed in step 77 down to the axis line; then add that value to the 'area' coordinate of the encroachment point.
80. Starting from the point where the vertical line at the encroachment intensity and the axis line intersect (computed in step 79), compute the vertex of step 79 which is on the vertical line at the encroachment intensity but below the axis line by retrieving the value of belowHeightPctLeft from the parameter set, dividing it by 100.0 and multiplying it by the length of the vertical line segment from the vertex computed in step 78 up to the axis line; then subtract that value from the area value of the encroachment point. That is the 'area' coordinate of the point.
81. Two vertices lie on the vertical line which has the intensity computed in step 74. Compute the intersecting (intensity, area) point where the axis and the vertical line of step 74 intersect. Then compute the 'area' coordinate of the vertex on the line and above the axis by retrieving the value of "areaAboveMultiplier" from the parameter set and multiplying it by the averaged peak-to-trough area distance of step 76, and adding the result to the area coordinate of the point of intersection.
82. Compute the 'area' coordinate of the vertex on the line of step 74 which is below the axis by retrieving the value of "areaBelowMultiplier" from the parameter set and multiplying it by the averaged peak-to-trough area distance of step 76, and subtracting the result from the area coordinate of the point of intersection computed in step 81.
83. Two vertices are on a vertical line drawn through the falloff intensity, one above the axis line and one below it. Compute the point where the vertical line at the falloff intensity and the axis line intersect; call that point the "falloff point" for purposes of this process description. Compute the 'area' coordinate of the vertex with the falloff intensity and above the axis line by retrieving the value of aboveHeightPctRight from the parameter set, dividing it by 100.0, and multiplying it by the length of the vertical line segment from the vertex computed in step 81 down to the axis line; then add that value to the 'area' coordinate of the falloff point.
84. Starting from the falloff point from step 83, compute the vertex of step 83 which is on the vertical line at the falloff intensity but below the axis line by retrieving the value of belowHeightPctRight from the parameter set, dividing it by 100.0 and multiplying it by the length of the vertical line segment from the vertex computed in step 82 up to the axis line; then subtract that value from the area value of the falloff point. That is the 'area' coordinate of the point below the axis.
85. Eight gate vertex points have now been calculated from the event data set, unless an error was flagged midway through the process. Retrieve the value of perturbationSkips from the parameter set. If the number of event data sets processed since the last time a significant change in the data was noted in step 9 is less than or equal to perturbationSkips, including the current data set, do not create a gate. Instead, use "no gate" and apply the same operation to all cells that flow through the flow cytometry system until a new gate is created from processing a subsequent data set. However, if the number of event data sets processed since the last significant change is greater than perturbationSkips, apply the gate that has been calculated from the event data set by this process.
86. For each value that needs to be averaged with analogous values in subsequent iterations of the process, save the value that resulted from processing this data set.

In a further aspect, the process further comprises inventive techniques for finding a drift-corrected intensity [expansion of steps 57-59 above]

A. Create an event data set counter variable and initialize it to zero.
B. Each time a new event data set is processed, increment the counter. Increment the counter whether an error is flagged while the data is being processed or not, and whether a change in the character of the event data is detected in step 8 or not.
C. When a value to be averaged with analogous values from subsequent data sets is saved in step 86 for future use, save the value of the data set counter associated with the data set that resulted in the value being produced.
D. Calculate an average drift rate in variable X over the time period spanned by processing several data sets by subtracting the earliest available saved value of X from the most recent value of X to get DELTA_X, and subtracting the value of the data set counter associated with the earliest value from the value of the counter associated with the most recently-stored value to get DELTA_T; and then calculate DELTA_X/DELTA_T as the average drift.
E. To calculate the total drift adjustment for a specific recorded instance of a variable, multiply the average drift rate for the variable obtained from step D by the number of time periods (i.e., the number of event data sets that have been presented) that have passed since the value was recorded. The product of the multiplication represents the drift adjustment. Add the drift adjustment to the previously recorded value to get a drift-corrected value.

In certain aspects, the present invention provides sorted particle products produced by the systems and methods described herein. These sorted products may be of a higher and/or more consistent quality. In certain aspects, the sorted particle products of the present invention are sexed sperm cell samples. The sexed sperm cell samples may be predominantly X-chromosome bearing sperm cells, or predominantly Y-chromosome bearing sperm cells. The sexed semen samples may be at least 60%, at least 65%, at least 70%, at least 75%, at least 80%, at least 85%, at least 90%, at least 91%, at least 92%, at least 93%, at least 94% at least 95% at least 96%, at least 97%, at least 98%, or at least 99% (or any percentage within the range of 60-100%) X-chromosome bearing or Y-chromosome bearing sperm cells. The sexed sperm cell samples may comprise a salt-based media formulation, optionally including any number of beneficial ingredients, including but not limited to, cryopreservation agents (such as glycerol), anti-oxidants, extenders, proteins, vitamins, and sugars. The sexed sperm cell samples may be suitable for fertilization, including by artificial insemination (AI) or in vitro fertilization (IVF).

EXAMPLES

Discrimination of Y Chromosome-Bearing Sperm Cells Using Programmed Optimized Gating System For certain implementations of semen sexing, the mixture of cells present in raw ejaculate (along with any dead cells and clumps of cells) is enriched for either live X chromosome bearing sperm cells or Y chromosome bearing sperm cells. For dairy applications, X chromosome bearing sperm cells are preferred to produce pregnancies that will result in female offspring. The enrichment is usually performed either using droplet sorting or by laser ablation. In laser ablation applications, a "kill" laser attempts to kill all cells that do not have the desired characteristic (i.e. any cell that is not a live X chromosome bearing sperm cell). In the present system, the cells are labeled with a DNA-intercalating fluorescent dye, and the fluorescence emitted by each cell is detected as a measure of the total DNA content. The fluorescent signal produced by each cell (or clump of cells) is detected by an avalanche photodiode and recorded as an event. X chromosome bearing sperm cells in cattle possess approximately 3.8% more total DNA than Y chromosome bearing sperm cells, which translates into more fluorescence emitted by an X chromosome bearing sperm cell. This is detected as a larger fluorescence intensity (peak) for an event corresponding to an X chromosome bearing sperm cell, compared to an even corresponding to a Y chromosome bearing sperm cell. The area of the fluorescence signal for each event is also determined. The fluorescence signal area is an integration (i.e. the sum or total) of all the fluorescence from an event over the amount of time over which that event is detected. Each event can be represented graphically on a chart of intensity (peak) and area, and when the plots of many events are compiled, subpopulation of cells can be identified. For example, a subpopulation of X-chromosome bearing sperm cells are identifiable in relation to the Y chromosome bearing sperm cell subpopulation by its relatively higher intensity, and as individual cells based on the area (a doublet of cells will have a higher intensity and/or a larger area). The kill laser is triggered to fire at any event for which the event data produces a result that falls outside a certain region on the graph (i.e. the region containing the X-chromosome bearing sperm cells). The bounds of this region on the graph are the gate. In previous iterations of the system, a software operator created a gate by clicking on locations in the peak-intensity graph. The polygon describing the gate was created by sequentially selecting vertices until the polygon was completed. If the polygon was successfully described (i.e. it comprised at least three vertices) the coordinates of the gate vertices were sent to the GPP and from there to the DSP, to control the kill laser such that the kill laser was triggered by an even that was detected as falling outside the gate.

It was observed that different operators drew gates in different ways resulting in an unknown amount of variability in specific desired results, whether it be increased purity or increased production of sexed semen samples. Further, previous work has demonstrated that a gate which ascribes a subpopulation at the beginning of a run may not ascribe that same population at the end of the run, potentially due to several factors. Thus, there were three issues in the previous systems that needed to be resolved: lack of control over shape and location of gate creation, leading to product inconsistency and suboptimal collection conditions; inadequate centering of the gate around the female peak as event attributes drift during collection; and attendance by an operator to establish and maintain the fit of the gate to the X chromosome bearing sperm cell population.

To solve these issues, an algorithm was developed to set the gate vertices to draw the gate based on the known relationship between the X chromosome bearing sperm cell population and the Y chromosome bearing sperm cell population. Specifically, when compiling the events, the vertices of the gate were determined from the distribution of the events by use of an algorithm to perform the following operation. In the performance of the algorithm, the system uses a parameter set that includes: the frequency of the gate calculation and the maximum number of events whose data will be directly used for a gate calculation; the peak-to-trough (P2T) threshold, and the configuration settings for calculating the gate vertices. The algorithm is carried out as follows:

1. Accumulate events—added to the register one at a time from an external source (the cytometer), by calling static function, which in turn calls public member function. The frequency of the gate calculation and the maximum number of events whose data will be directly used for a gate calculation are obtained from the parameter set.
   a. Events are stored in an array. If there are fewer than a set default number of events in the array when the function is called, and error is returned.
   b. The array of accumulated events is a circular buffer. The number of events currently in the buffer, starting at index zero, is initialized to zero and incremented each time an event is registered. Once the number of events reaches the size of the buffer, it is longer incremented, and new events that are added overwrite the oldest events. A second variable provided, is the index at which the next event is going to be written. It is also initialized to zero.
   c. Determine whether enough events have been accumulated to attempt to calculate a gate. Once enough events have been accumulated, proceed with calculating gate.
   d. The accumulated events are copied to a separate array, and sorted into ascending order by peak values, then by area values. The sorting occurs by creating an array of pointers to the events. Save the median value of event areas from this data set.
   e. There is also the option to add multiple events at the same time by providing an array of Events. However, that is not a static function and the caller would need to call it. The caller determines whether to add them separately or in buffers of multiple events.
   f. Determine whether the character of event data has changed significantly since the last calculation by comparing the median values of intensity and area against the corresponding median values from the data set for the last calculation. If the character of event data has changed significantly, first save, then clear data related to previous gates so that it will not affect the gate resulting from the current data set.
2. Calculate the gate by calling calculate gate function. The following occur in this function:
   a. Create a histogram of event peak values. The range of values which are placed in histogram bins is 0 to 65535, and they are sorted into 512 equal-sized bins that collectively cover the full range. The number of bins is 512, with width of each bin being 128.

b. Find the highest peaks in the histogram and determine which, if any, meet the criterion for being the male and female peaks. The three highest peaks are found and sorted into order by height. Three, not two, are identified, to account for a situation wherein one of the two highest apparent peaks is not in fact a peak, but rather a spike on the side of the female or male peaks.
  1. The indexes into the histogram of the left-most and right-most allowable peak locations are calculated. Those indexes are 25% from the left edge of the histogram and 15% from the right edge of the histogram.
  2. Locate the three highest peaks within the allowed region by bin number. A "peak" is a histogram bin for which the bins to both the left and the right have a lower value. If two or more adjacent bins have the same value and bins on both sides are lower, that is not currently identified as a peak and should be considered a bug.
  3. Sort the bin numbers of the histogram peaks located in the previous step, in descending order by bin height (number of events in each bin).
  4. The portions of the histogram which are outside the allowed limits of left-most and right-most allowable peak locations are checked for peaks. If any peak is identified outside the allowed limits which is higher than the second-highest of the three highest peaks found within the allowed range, an error is returned, due to the requirement that male and female peaks must be the two highest peaks, and must be within the cutoff limits on the left and right sides.
  5. The male and female peaks, if correctly identified, will always be between 2.8% and 4.8% apart. The algorithm uses this information to process the three highest peaks and identify which are the male and female peaks, if any. If only two peaks were found within the allowed range, they must be the correct distance apart, otherwise flag a calculation error and wait for a new event data set to be available.
  6. If three peaks were found within the allowed range, the identification of which of two close peaks is a spike of the other is done by finding the lowest point between them, and then, moving away from the lowest point in both directions, find the place on the other side of each of the two close peaks which is at the same height as the trough. The side which is wider is the "real" peak, and the side that is narrower is the "spike".
  7. If exactly two of the three highest peaks are 2.8% to 4.8% apart, those two are candidates for the male and female peaks. The third peak is checked to see if it is a spike of one of the other two by virtue of being very close to one of them. If it is a spike, it is ignored. If it is not a spike and is higher than either of the other two, flag a calculation error and wait for a new event data set to be available.
  8. If the three peaks are about equally spaced and about 3.8% apart, then
    i. The center and right-most peaks are candidates for male and female peaks, if the left-most peak is less than 2/3 the height of the right-most peak; or
    ii. the center and left-most peaks are candidates for male and female peaks, if the right-most peak is less than 2/3 the height of the left-most peak.
    iii. If neither (i) or (ii) is satisfied, an error is returned.
  9. If none of the three highest peaks are about 3.8% distance apart, flag a calculation error and wait for a new event data set to be available.
  10. After the candidates for male and female peaks are chosen by any of the above means, they are double-checked to confirm that either they are the two highest peaks, or the other, highest peak is a spike of one of the other two. If this is not true, an error is generated. Otherwise, the candidate peaks considered to be the male and female peaks.
c. Determine the x-coordinate (intensity) values for the peaks. Exact x-coordinate peak values are calculated for the male and female histogram peaks that have been identified, to be more accurate than their bin identifiers.
  1. The exact histogram bin for the center of each peak is determined by applying a least-squares polygon fitting algorithm. The peaks in the histogram are quite sharp. Only a few bins are used to calculate the peak's center. The left-most and right-most bins to use are determined by calculating the distance from the peak to the trough between the two peaks (in number of histogram bins) and using that distance from the center of the peak in both directions to determine the limits that of the histogram peak bins fed into the curve-fitting algorithm.
  2. The degree of polynomial used for the fit is set as the number of bins fed into the algorithm. After the polynomial is fitted, the Newton-Raphson algorithm is applied to find the "x" value at which the slope of the polynomial is zero, in the vicinity of the estimated peak, to an accuracy of at least within $1/65536$. The result of the Newton-Raphson algorithm is used as the center of the peak.
  3. If a NaN (not-a-number) occurs in the floating point processor while doing the polynomial curve-fitting, an error is returned, but execution proceeds. If the Newton-Raphson algorithm fails to identify the center of the peak within 1000 iterations (usually it only take around ten iterations), an error is returned, but execution proceeds.
  4. The x-coordinate peak value of each peak is calculated as the exact histogram bin for the center of each peak provided by the polynomial fitting algorithm multiplied by the histogram bin width.
  5. The female peak is taken to be the right-most of the two identified peaks, i.e. is the peak with the larger event peak 'x' co-ordinate.
d. Determine the bin which contains the trough. The peak-to-trough (P2T) ratio is calculated at this point, and compared to a P2T threshold, otherwise set at a default value of 1.2. If the P2T ratio in the histogram is too low, an error is generated.
  1. Calculate the P2T ration as $((P1+P2)/2)/T$, where P1 and P2 are the counts in the male and female intensity histogram peak bins respectively, and T is the counts in the trough bin.
  2. Calculate the peak dominance value as $(P2-T)/(P1-T)$, and retrieve the peak dominance threshold value from the parameter set.

3. Compare the calculated P2T ratio to the P2T threshold value. If the peak-to-trough ratio is less than the threshold value, flag an error and wait for a new data set to be available.
4. Compare the calculated peak dominance value to the peak dominance threshold value. If the calculated peak dominance value is less than the threshold value, flag an error and wait for a new data set to be available.

e. Determine the trough height as the height of the histogram at the lowest point between the two peaks in the histogram.

f. For both male and female peaks separately, create a histogram of event area values and find the highest peak in this 'area' histogram, and use this to determine the y-coordinate values for the male or female peak.
   1. The y-coordinates of the male and female peak points—where the events are most frequent—are found by using only the events whose event Peak values are close to the calculated 'x' values, that is events whose event peak values are within 0.3% of 65536 (the range of event peak values). The range of event peak values whose event area values are used to find the peak's y-coordinate is from:

peak_x−(65536*PEAK_WIDTH_PCT*0.01) to peak_x+(65536*PEAK_WIDTH_PCT*0.01).

2. The event area values for events close to the male peak and for events close to the female peak are placed into separate arrays. Both these arrays of 'area' values are sorted into ascending order.
   3. Create histograms of the area values for male and female peaks separately.
      i. The bin width for this histogram is calculated, not predefined, using the following steps:
         calculate the number equal to 75% of the number of area values for the peak (numValuesIn75pct);
         calculate the number equal to 99% of the number of area values for the peak (largestRetainedIndex);
         ignore area values whose value is greater than the 99th percentile of all area values, which is determined from largestRetainedIndex;
         identify the area value which is at the 99th percentile (largestRetainedArea);
         find the area value which marks the 75th percentile of area values, using numValuesIn75pct (lowest75pct Max);
         find the smallest area value in the array of sorted area values from events near the peak (lowest75pct Min);
         calculate the range of area values in the lowest 75% of area values (areaRange;=lowest75pct Max−lowest75pct Min);
         calculate the bin width as areaRange/512 (areaBinWidth);
         calculate the number of bins as (largestRetainedArea/areaBinWidth)+1 (numberOfAreaBins);
         If the number of area values being binned is less than 6 times the number of bins just calculated, numberOfAreaBins=(largestRetainedIndex/6)+1; if (numberOfAreaBins<4), numberOfAreaBins=4;
         areaBinWidth=largestRetainedArea/(numberOfAreaBins−1)
      ii. After the histograms of area values have been created with the calculated number of bins and bin width, the histogram values are smoothed using a range of 15 bins centered around each smoothed bin value.
      iii. Find the largest value in the area histogram.
      iv. Determine the range of area bins to submit to the least-squares curve-fitting algorithm.
         The area bin count that is 20% of the maximum area bin count (20% of the "peak" area) is calculated
         Moving left from the histogram maximum peak towards bins of smaller areas, the first bin whose count is less than 20% of the maximum bin count is found. This marks the left-most bin submitted to the curve-fitting algorithm.
         The same is done moving to the right from the histogram maximum, to find the right-most bin submitted to the curve-fitting algorithm
      v. The area histograms are submitted to the least-squares polynomial curve-fitting algorithm and then the Newton-Raphson algorithm to obtain a more precise area value which is used for the 'y' coordinate of each peak in the same units as event area
         If an error is generated while finding the 'y' coordinate value, do not fall back to the highest point. The data is too sparse and even the smoothed histogram is too inaccurate to be able to rely on the highest 'area' bin as the peak. If no good 'y' can be generated from the least-squares polynomial curve-fitting, an error is generated and gate calculation is aborted.

g. Calculate the values for the female and male peak intensity coordinates and the trough intensity that have been adjusted for drift in the electronics that has occurred since the event data set was processed from the last thirty event data sets. If there are fewer than thirty previous values available, average only the values that are available.
   1. Create an event data set counter variable and initialize it to zero.
   2. Each time a new event data set is processed, increment the counter. Increment the counter whether an error is flagged while the data is being processed or not, and whether a change in the character of the event data is detected in step 8 or not.
   3. When a value to be averaged with analogous values from subsequent data sets is saved for future use, save the value of the data set counter associated with the data set that resulted in the value being produced.
   4. Calculate an average drift rate in variable X over the time period spanned by processing several data sets by subtracting the earliest available saved value of X from the most recent value of X to get DELTA_X, and subtracting the value of the data set counter associated with the earliest value from the value of the counter associated with the most recently-stored value to get DELTA_T; and then calculate DELTA_X/DELTA_T as the average drift.

5. To calculate the total drift adjustment for a specific recorded instance of a variable, multiply the average drift rate for the variable obtained from step D by the number of time periods (i.e., the number of event data sets that have been presented) that have passed since the value was recorded. The product of the multiplication represents the drift adjustment. Add the drift adjustment to the previously recorded value to get a drift-corrected value.
6. Calculate the peak-to-trough intensity distance by finding the difference between the trough intensity and the peak intensity of the peak relative to which the gate is drawn.
7. Generate an 'averaged peak-to-trough intensity distance by averaging the peak-to-trough intensity distance from previous step with the peak-to-trough intensity distances from the last thirty event data sets. If there are fewer than thirty previous values available, average only the values that are available.

h. Calculate the trough x-coordinate from the bin. Calculate the trough y-coordinate so that the trough point lies on a line drawn through the male and female (x,y) peaks. With the (x,y) coordinates of the male and female peaks identified, and with the 'x' coordinate of the trough between them identified, the 'y' coordinate of the trough point is calculated as being on a line passing through male and female peak points. This line is the axis for the gate i. Using male and female peak coordinates and the trough coordinates, calculate gate vertices. The gate is oriented along the axis line drawn between male and female coordinates.
   1. Obtaining the encroachmentPct value from the parameter set. Divide it by 100.0 and subtract the result from 1.0 to obtain the 'encroachmentMultiplier' used in subsequent steps.
   2. Generate encroachmentAdjustment by multiplying the averaged peak-to-trough intensity distance by the encroachmentMultiplier.
   3. Calculate encroachment intensity. Two vertices lie on a vertical line drawn through the encroachment intensity.
      i. If the gate is being created relative to the male peak, the encroachment intensity is the averaged male peak intensity plus the encroachmentAdjustment. For the male peak, the encroachment intensity is the intensity coordinate of the vertex or vertices of the gate which are furthest to the right on the intensity axis in the (intensity, area) plane.
      ii. If the gate is being created relative to the female peak, the encroachment intensity is the averaged female peak intensity minus the encroachmentAdjustment. For the female peak, the encroachment intensity is the intensity coordinate of the vertex or vertices of the gate which are furthest to the left on the intensity axis in the (intensity, area) plane.
   4. Retrieve the peakFalloffPct value from the parameter set. This is a decimal value in the range 0.0 to 100.0. Currently 65.0 is used, but some other value may eventually be determined to be best. Divide peakFalloffPct by 100.0, then multiply it by the height of the highest bin in the relevant peak in the intensity histogram (step 10). The relevant peak is the male intensity peak or the female intensity peak, depending on which peak the gate is being calculated relative to. Call the product of the multiplication the 'falloffValue' for purposes of this process description.
   5. Calculate falloff intensity: Starting with the highest intensity histogram bin in the relevant peak, move away from the trough bin of step 23 until the height of the bin currently examined is less than or equal to falloffValue. Calculate the intensity value corresponding to the center of this bin as [bin index+0.5]×[bin width].
   6. Calculate average falloff intensity by averaging the falloff intensity from previous step with the falloff intensities from the last thirty event data sets. If there are fewer than thirty previous values available, average only the values that are available.
   7. Take the averaged falloff intensity as the initial value for the intensity coordinate in the (intensity, area) plane of the two gate vertices which are furthest to the right in a gate drawn relative to the female peak, or furthest to the left in a gate drawn relative to the male peak.
   8. Calculate extension distance by retrieving the 'octExtension' value from the parameter set and multiplying by the averaged peak-to-trough intensity distance. octExtension is a decimal value greater than 0.0. A default value 0.6 is used, but that may be changed as needed.
      i. If the gate is being drawn relative to the male peak, subtract the extension distance from the initial averaged falloff intensity value computed. Use the result as the final value for the intensity coordinate in the (intensity, area) plane of the two gate vertices which are furthest to the left in a gate drawn relative to the male peak.
      ii. If the gate is being drawn relative to the female peak, add the extension distance to the initial value. Use the result as the final value for the intensity coordinate in the (intensity, area) plane of the two gate vertices which are furthest to the right in a gate drawn relative to the female peak.
   9. Calculate the average of the encroachment intensity and the averaged female peak intensity, for a gate drawn relative to the female peak, or the averaged male peak intensity, for a gate drawn relative to the male peak.
   10. Retrieve the 'horizAdjMultiplier1' value from the parameter set and multiply it by the averaged peak-to-trough intensity distance. Add the product to the average of the encroachment intensity value computed in the previous step.
      i. For a gate relative to the female peak, the result is used as the intensity coordinate in the (intensity, area) plane for two vertices on a vertical line which is to the right of the encroachment intensity.
      ii. For a gate relative to the male peak, the line is to the left of the encroachment intensity. The value of 0.0 is currently used for horizAdjMultiplier1, but that may be changed.
   11. Calculate the average of the averaged falloff intensity and either the averaged female peak intensity, for a gate drawn relative to the female peak, or the averaged male peak intensity, for a gate drawn relative to the male peak.

12. Retrieve the 'horizAdjMultiplier2' value from the parameter set. Multiply it by the averaged peak-to-trough intensity distance. Add the product to the value computed in the previous step.
    i. For a gate relative to the female peak, the result is used as the intensity coordinate in the (intensity, area) plane for two vertices on a vertical line which is to the right of the line calculated in step 10 and to the left of a line drawn through the falloff intensity.
    ii. For a gate relative to the male peak, the line is to the left of the line calculated in step 10 and to the right of a line drawn through the falloff intensity. The value of 0.0 is currently used for horizAdjMultiplier2, but that may be changed.
13. Calculate the peak-to-trough area distance as the difference between the trough 'area' coordinate from and the peak area coordinate of the peak relative to which the gate is drawn.
14. Calculate the averaged peak-to-trough area distance by averaging the peak-to-trough area distance from the previous step with the peak-to-trough area distances from the last thirty event data sets. If there are fewer than thirty previous values available, average only the values that are available.
15. Compute the intersecting (intensity, area) point where the axis and the vertical line of step 10 intersect and find the vertices above and below the axis that fall on this line.
    i. Compute the 'area' coordinate of the vertex on the vertical line and above the axis by retrieving the value of "areaAboveMultiplier" from the parameter set and multiplying it by the averaged peak-to-trough area distance of step 14, and adding the result to the area coordinate of the point of intersection.
    ii. Compute the 'area' coordinate of the vertex on the line of step 10 which is below the axis by retrieving the value of "areaBelowMultiplier" from the parameter set and multiplying it by the averaged peak-to-trough area distance of step 14, and subtracting the result from the area coordinate of the point of intersection.
16. Locate the two vertices on a vertical line drawn through the encroachment point, one above the axis line and one below it. Compute the point where the vertical line at the encroachment intensity and the axis line intersect; call that point the "encroachment point" for purposes of this process description.
    i. Compute the 'area' coordinate of the vertex with the encroachment intensity and above the axis line by retrieving the value of aboveHeightPctLeft from the parameter set, dividing it by 100.0, and multiplying it by the length of the vertical line segment from the vertex computed in step 15 down to the axis line; then add that value to the 'area' coordinate of the encroachment point.
    ii. Starting from the point where the vertical line at the encroachment intensity and the axis line intersect, compute the vertex which is on the vertical line at the encroachment intensity but below the axis line by retrieving the value of belowHeightPctLeft from the parameter set, dividing it by 100.0 and multiplying it by the length of the vertical line segment from the vertex computed in step 15 up to the axis line; then subtract that value from the area value of the encroachment point. That is the 'area' coordinate of the point.
17. Locate the two vertices that lie on the vertical line which has the intensity computed in step 12. Compute the intersecting (intensity, area) point where the axis and the vertical line of step 12 intersect.
    i. Compute the 'area' coordinate of the vertex on the line and above the axis by retrieving the value of "areaAboveMultiplier" from the parameter set and multiplying it by the averaged peak-to-trough area distance of step 14, and adding the result to the area coordinate of the point of intersection.
    ii. Compute the 'area' coordinate of the vertex on the line of step 12 which is below the axis by retrieving the value of "areaBelowMultiplier" from the parameter set and multiplying it by the averaged peak-to-trough area distance of step 14, and subtracting the result from the area coordinate of the point of intersection computed for the vertex on the line and above the axis.
18. Locate the two vertices are on a vertical line drawn through the falloff intensity, one above the axis line and one below it. Compute the falloff point as the point where the vertical line at the falloff intensity and the axis line intersect.
    i. Compute the 'area' coordinate of the vertex with the falloff intensity and above the axis line by retrieving the value of aboveHeightPctRight from the parameter set, dividing it by 100.0, and multiplying it by the length of the vertical line segment from the vertex computed in step 17 down to the axis line; then add that value to the 'area' coordinate of the falloff point.
    ii. Starting from the falloff point with the falloff intensity and above the axis, compute the vertex of which is on the vertical line at the falloff intensity but below the axis line by retrieving the value of belowHeightPctRight from the parameter set, dividing it by 100.0 and multiplying it by the length of the vertical line segment from the vertex computed in step 17 up to the axis line; then subtract that value from the area value of the falloff point. That is the 'area' coordinate of the point below the axis.

Sexing of Bovine Sperm Cells Using Programmed Optimized Gating System

A laser ablation semen sexing cytometer was adapted to implement the optimized sorting strategy set out in the above example. Semen from a 2-year old Holstein bull was collected and prepared according to standard procedure. Briefly, collected semen was assessed for motility and the presence of abnormalities, and found to meet standards for processing. The sperm cell concentration was then determined, and the sample was stained with Hoechst 33342 at 34° C. for 45 minutes prior to sexing. The sexing instrument includes a flow controller for delivery of the stained sperm cells and sheath fluid to a microfluidic chip. Sperm cell detection is carried out using a Vanguard™ mode-locked 355 laser (Spectra-Physics®), and fluorescence is detected using an avalanche photodiode. Unwanted Y-chromosome bearing sperm cells are ablated using an Explorer XP lasers Q-switch laser (Spectra-Physics®). Stained perm cells were processed over approximately 9 hours.

Discrimination of X- and Y-chromosome bearing sperm cells was carried out using an optimized gating strategy according to an embodiment of the present invention, as detailed in the above Example. Following sorting, the collected sample yielded approximately 51.46 million sperm cells. During operation, the values of the various gating parameters were monitored to observe the operation of the gating system. Extracted portions of the histograms of intensity values generated from events at two timepoints ten minutes apart during a single sample run were compared. Curves were fitted to the peaks as well as to the trough; mathematical analysis of the fitted curves yields the more precise peak and trough bin values shown above each graph. The precise peak and trough values were converted to actual intensity values by multiplying by the bin size, which is 128. Thus, for example, the male peak intensity in the histogram on the left is 223.06×128.0=28551.68.

Comparison of the intensity values for the peaks at the two different time points shows a significant shift in the female peak intensity from 29625 to 29386 (239 intensity units, or about 0.81%) over ten minutes. The trough similarly shifts from 29101 to 28832 (269 intensity units). The gate must shift a similar amount in order to maintain the correct relationship to the location of the female peak.

Since a gate is to be constructed around the female peak, similar histograms are constructed programmatically for the 'area' values of all events whose intensities are near the female peak intensities. Those histograms only show one peak. The analyzed histograms of the 'area' values placed the female area peaks at 4972333 at the first time point and at 4952019 at the second time point.

All the intensity coordinates of the gate shift left (lower) over the ten minutes between the two time points. The intensity coordinates of the gate vertices at the first time point average 29735.28. The corresponding average at the second time point (10 minutes later) is 29465.78. This corresponds to an average shift downwards of 269.5 intensity units. This compares favorably with the shift downwards of the female peak intensity of 239 intensity units, and of the intensity at the trough's shift downwards of 269 intensity units. The gate has shifted left to maintain the relationship with the female peak.

The female peak's area coordinate also shifts downwards during the ten minutes. All the gate's area coordinates for the vertices shift downwards similarly.

Differences between the precise amounts of shifts in instantaneous peak coordinates versus gate vertex coordinates are primarily due to the use of trough-to-female-peak distance in calculating the vertices. Since the trough and female peak are independent statistical entities, the vertex coordinates can show a very slightly different shift between two timepoints than the female peak, although the average shifts of vertex coordinates and peak coordinates over time are equal.

It will be understood by those skilled in the art that various changes may be made and equivalents may be substituted without departing from the scope of the novel techniques disclosed in this application. In addition, many modifications may be made to adapt a particular situation or material to the teachings of the novel techniques without departing from its scope. Therefore, it is intended that the novel techniques not be limited to the particular techniques disclosed, but that they will include all techniques falling within the scope of the appended claims.

The invention claimed is:

1. A method for identifying subpopulations within a mixture of particles, the subpopulations comprising two or more subpopulations, each subpopulation being distinguishable by a characteristic, the method comprising:
   measuring the characteristics of the two or more subpopulations in a first set of particles in the mixture of particles;
   distinguishing the values of the measured characteristics for each of the two or more subpopulations in the first set of particles in the mixture of particles;
   assigning a critical range of values to each of the two or more subpopulations based on the distinguishing;
   subsequent to assigning the critical range of values, measuring the characteristics of the two or more subpopulations in a second set of particles in the mixture of particles;
   subsequent to measuring the characteristics of the two or more subpopulations in the second set of particles in the mixture of particles, distinguishing the values of the measured characteristics for each of the two or more subpopulations in the second set of particles;
   updating the critical range of values based on the distinguishing of the values of the measured characteristics for each of the two or more subpopulations in the second set of particles in real time;
   assigning a subpopulation classification to particles in the mixture of particles based on the updated critical range of values; and
   sorting said particles in the mixture of particles according to the classification assigned to the particles based on the updated critical range of values.

2. The method of claim 1, further comprising destroying or incapacitating the subpopulation assigned the classification.

3. The method of claim 1, wherein the particles are sperm cells.

4. The method of claim 3, wherein the characteristic of the sperm cells is the presence of an X-chromosome or a Y chromosome.

5. The method of claim 3, wherein said sperm cells have been stained with a fluorescent DNA-binding dye.

6. A method for identifying multiple sets of particles within a mixture of particles, each set of particles having a characteristic different from the other sets of particles, comprising:
   providing the mixture of particles;
   detecting a characteristic of a first set of particles within the mixture of particles to produce a signal indicative of the characteristic for the first set of particles;
   generating event data for the signal indicative of the characteristic for said first set of particles;
   compiling the event data for the first set of particles;
   generating a distribution of event data for the first set of particles;
   calculating at least one discrimination value that defines a subpopulation of particles based on the distribution of event data for the first set of particles;
   identifying a plurality of subpopulations of particles based on the at least one discrimination value;
   assigning a critical range of values to each subpopulation of the plurality of subpopulations of particles;
   classifying particles in the subpopulation of particles based on the discrimination value that defines said subpopulation of particles;
   updating the critical range of values based on the classifying, in real time; and sorting said particles in the subpopulation of particles according to the classification assigned to the particles in the subpopulation of particles based on the updated critical range of values.

7. The method of claim 6, further comprising instructing a sorting apparatus to include or exclude events based on the classification assigned to the particles in the subpopulation of particles.

8. The method of claim 6, further comprising destroying or incapacitating the particles in the subpopulation of particles assigned the classification.

9. The method of claim 6, wherein the particles are sperm cells.

10. The method of claim 9, wherein the characteristic of said sperm cells is the presence of an X-chromosome or a Y-chromosome.

11. The method of claim 9, wherein said sperm cells are labeled with a fluorescent DNA-binding dye.

12. The method of claim 6, wherein said calculating at least one discrimination value comprises defining at least one critical value related to a detected characteristic.

13. The method of claim 12, wherein said calculating at least one discrimination value further comprises:
    identifying at least one critical value for a first characteristic from the distribution of event data for the first set of particles;
    obtaining the values for a second characteristic associated with the critical value for the first characteristic;
    producing a distribution of the values for the second characteristic;
    identifying at least one critical value for the second characteristic from the distribution of values for the second characteristic;
    co-locating the at least one critical value for the first characteristic and the at least one critical value for the second characteristic in a feature space; and
    determining the at least one discrimination value from the critical values co-located in the feature space.

14. The method of claim 13, wherein said calculation of the at least one discrimination value further comprises adjusting the critical values to include event data from a second set of particles.

15. The method of claim 13, wherein the critical values comprise one or more peak characteristic values for a first subpopulation, and one or more peak characteristic values for a second subpopulation.

16. The method of claim 15 wherein the peak characteristic values comprise peak fluorescence intensity and peak total fluorescence.

17. The method of claim 15, wherein said critical values further comprise a trough value between the peak characteristic values for the first and second subpopulations.

18. The method of claim 6, wherein the discrimination value comprises a gate.

19. A system for producing a sexed sperm sample, comprising:
    a sample delivery apparatus for delivery of a mixture of sperm cells,
    a flow cytometry apparatus,
    a control comprising stored instructions configured to:
        distinguish values of measured characteristics for each subpopulation in a plurality of subpopulations in the mixture of sperm cells,
        assign a critical range of values to each of the subpopulations based on the distinguishing,
        update the critical range of values based on the distinguishing of the values of the measured characteristics for subpopulations in a second set of particles in real time,
        assign a subpopulation classification to particles in the mixture based on the updated critical range of values, and
        sort said particles in the mixture according to the classification assigned to the particles based on the updated critical range of values; and
    a sorting apparatus.

* * * * *